US012581380B2

(12) United States Patent
Wang et al.

(10) Patent No.: US 12,581,380 B2
(45) Date of Patent: Mar. 17, 2026

(54) TECHNIQUES FOR BUFFER ADJUSTMENT FOR HANDOVER

(71) Applicant: QUALCOMM Incorporated, San Diego, CA (US)

(72) Inventors: Min Wang, San Diego, CA (US); Pravjyot Singh Deogun, Bengaluru (IN); Mouaffac Ambriss, San Diego, CA (US); Carlos Marcelo Dias Pazos, Carlsbad, CA (US); Arvind Vardarajan Santhanam, San Diego, CA (US); Yong Xie, San Diego, CA (US); Vikram Singh, San Diego, CA (US); Reza Shahidi, La Jolla, CA (US); Shankar Ganesh Lakshmanaswamy, Bangalore (IN); Manjunatha Kantharaju, Bangalore (IN); Ertugrul Necdet Ciftcioglu, North Reading, MA (US); Vaishali Ailani Rai, Bangalore (IN); Kuo-Chun Lee, San Diego, CA (US); Arnaud Meylan, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 18/255,210

(22) PCT Filed: Aug. 25, 2021

(86) PCT No.: PCT/US2021/071274
§ 371 (c)(1),
(2) Date: May 31, 2023

(87) PCT Pub. No.: WO2022/177647
PCT Pub. Date: Aug. 25, 2022

(65) Prior Publication Data
US 2024/0098591 A1 Mar. 21, 2024

(30) Foreign Application Priority Data

Feb. 19, 2021 (IN) .............................. 202141006993

(51) Int. Cl.
*H04W 36/02* (2009.01)

(52) U.S. Cl.
CPC ................................. *H04W 36/023* (2013.01)

(58) Field of Classification Search
CPC .................................................. H04W 36/023
See application file for complete search history.

(56) References Cited

U.S. PATENT DOCUMENTS

| | | | | |
|---|---|---|---|---|
| 10,291,541 B1* | 5/2019 | Sung | ........................ | H04L 47/32 |
| 2015/0146689 A1* | 5/2015 | Fu | ......................... | H04J 3/0632 |
| | | | | 370/331 |

(Continued)

OTHER PUBLICATIONS

Huawei, et al., "Motivation for a New SI Proposal: NR Voice Enhancements", 3GPP Draft, RP-180398, 3GPP TSG RAN Meeting #79, 3rd Generation Partnership Project (3GPP), Mobile Competence Centre, 650, Route Des Lucioles, F-06921 Sophia-Antipolis Cedex, France, vol. TSG RAN, No. Chennai, India, Mar. 19, 2018-Mar. 22, 2018, Mar. 12, 2018 (Mar. 12, 2018), XP051509546, 13 Pages, Slide 6, p. 5.

(Continued)

*Primary Examiner* — Samina F Choudhry
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may identify an indication of an occurrence of a handover. The UE may adjust a delay used by a buffer based at least in part on the indication of the occurrence of the handover. The UE may process one or more packets of the (Continued)

buffer based at least in part on the adjustment of the delay used by the buffer. Numerous other aspects are described.

30 Claims, 10 Drawing Sheets

(56)                References Cited

U.S. PATENT DOCUMENTS

| 2016/0150455 | A1* | 5/2016 | Suryavanshi | ......... | H04W 76/45 |
| | | | | | 455/436 |
| 2016/0344642 | A1 | 11/2016 | Brisebois et al. | | |
| 2016/0345220 | A1 | 11/2016 | Brisebois et al. | | |
| 2019/0014050 | A1* | 1/2019 | Wang | ................. | H04L 49/9005 |
| 2019/0261197 | A1* | 8/2019 | Bellamkonda | ........ | H04W 16/18 |
| 2020/0022055 | A1* | 1/2020 | Yan | ................. | H04W 36/00837 |
| 2020/0092786 | A1 | 3/2020 | Lakshmanaswamy et al. | | |

OTHER PUBLICATIONS

International Search Report and Written Opinion—PCT/US2021/071274—ISA/EPO—Dec. 13, 2021.

\* cited by examiner

400

710 Identify an indication of an occurrence of a handover

720 Adjust a delay used by a buffer based at least in part on the indication of the occurrence of the handover 730 Process one or more packets of the buffer based at least in part on the adjustment of the delay used by the buffer

700

810 — Determine that a delay used by a buffer is to be adjusted based at least in part on a handover rate 820 — Adjust the delay used by the buffer based at least in part on the determination that the delay used by the buffer is to be adjusted 830 — Process one or more packets of the buffer based at least in part on the adjustment of the delay used by the buffer

800

TECHNIQUES FOR BUFFER ADJUSTMENT FOR HANDOVER

CROSS-REFERENCE TO RELATED APPLICATIONS

This Patent Application is a 371 national stage of PCT Application No. PCT/US2021/071274 filed on Aug. 25, 2021, entitled "TECHNIQUES FOR BUFFER ADJUST-MENT FOR HANDOVER," which claims priority to India Patent Application No. 202141006993, filed on Feb. 19, 2021, entitled "TECHNIQUES FOR BUFFER ADJUST-MENT FOR HANDOVER" and assigned to the assignee hereof. The disclosure of the prior Applications are consid-ered part of and are incorporated by reference into this Patent Application.

FIELD OF THE DISCLOSURE

Aspects of the present disclosure generally relate to wireless communication and to techniques and apparatuses for buffer adjustment for handover.

DESCRIPTION OF RELATED ART

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier fre-quency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile stan-dard promulgated by the Third Generation Partnership Proj-ect (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promul-gated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broad-band access continues to increase, further improvements in LTE, NR, and other radio access technologies remain useful.

SUMMARY

In some aspects, a method of wireless communication performed by a user equipment (UE) includes identifying an indication of an occurrence of a handover; adjusting a delay used by a buffer based at least in part on the indication of the occurrence of the handover; and processing one or more packets of the buffer based at least in part on the adjustment of the delay used by the buffer.

In some aspects, the adjustment of the delay is an increase of the delay.

In some aspects, the indication of the occurrence of the handover is based at least in part on one or more of a sensor input or an output of a machine learning model.

In some aspects, the indication of the occurrence of the handover includes one or more of: a satisfaction of a pre-handover condition, a handover command, or a han-dover trigger.

In some aspects, the pre-handover condition is based at least in part on a condition for triggering measurement reporting or handover.

In some aspects, the condition for triggering measurement reporting or handover is that a signal strength measurement satisfies a threshold value, and wherein the pre-handover condition is that the signal strength measurement satisfies the threshold value adjusted by an offset value.

In some aspects, the method includes providing, by a radio resource control module or a mobility manager module of the UE, a pre-handover indication or a handover start indication to the buffer.

In some aspects, the pre-handover indication or the han-dover start indication identifies a type of the handover.

In some aspects, the delay used by the buffer is adjusted based at least in part on the pre-handover indication or the handover start indication.

In some aspects, the delay used by the buffer is adjusted to a time value that is based at least in part on an estimated handover interruption time associated with the handover.

In some aspects, the one or more packets of the buffer are processed, based at least in part on the adjustment of the delay, for a duration of a timer.

In some aspects, the one or more packets of the buffer are processed, based at least in part on the adjustment of the delay, until an indication of an occurrence of a handover conclusion.

In some aspects, the indication of the occurrence of the handover conclusion is based at least in part on one or more of a sensor input or an output of a machine learning model.

In some aspects, the indication of the occurrence of the handover conclusion includes one or more of: a satisfaction of a pre-handover cancel condition, a handover completion, or a handover failure.

In some aspects, the pre-handover cancel condition is based at least in part on a condition for exiting a triggered measurement reporting or handover.

In some aspects, the condition for exiting the triggered measurement reporting or handover is that a signal strength measurement satisfies a threshold value, and wherein the pre-handover cancel condition is that the signal strength measurement satisfies the threshold value adjusted by an offset value.

In some aspects, the method includes providing, by a radio resource control module or a mobility manager module of the UE, a pre-handover cancel indication, a handover end indication, or a handover failure indication to the buffer.

In some aspects, the delay used by the buffer is used without adjustment based at least in part on the pre-handover cancel indication, the handover end indication, or the handover failure indication.

In some aspects, a method of wireless communication performed by a UE includes determining that a delay used by a buffer is to be adjusted based at least in part on a handover rate; adjusting the delay used by the buffer based at least in part on the determination that the delay used by the buffer is to be adjusted; and processing one or more packets of the buffer based at least in part on the adjustment of the delay used by the buffer.

In some aspects, the adjustment of the delay is an increase of the delay.

In some aspects, the delay used by the buffer is adjusted based at least in part on the handover rate of the UE satisfying a threshold value for entering a delay adjustment time window.

In some aspects, the one or more packets of the buffer are processed, based at least in part on the adjustment of the delay, until the handover rate of the UE satisfies a threshold value for exiting a delay adjustment time window.

In some aspects, the delay used by the buffer is adjusted to a time value that is based at least in part on one or more estimated handover interruption times for handover types that are possible from a radio access technology used by a source cell for the UE.

In some aspects, the delay used by the buffer is adjusted to a time value that is based at least in part on one or more observed handover interruption times.

In some aspects, a UE for wireless communication includes a memory and one or more processors coupled to the memory, the one or more processors configured to: identify an indication of an occurrence of a handover; adjust a delay used by a buffer based at least in part on the indication of the occurrence of the handover; and process one or more packets of the buffer based at least in part on the adjustment of the delay used by the buffer.

In some aspects, the adjustment of the delay is an increase of the delay.

In some aspects, the indication of the occurrence of the handover is based at least in part on one or more of a sensor input or an output of a machine learning model.

In some aspects, the indication of the occurrence of the handover includes one or more of: a satisfaction of a pre-handover condition, a handover command, or a handover trigger.

In some aspects, the pre-handover condition is based at least in part on a condition for triggering measurement reporting or handover.

In some aspects, the condition for triggering measurement reporting or handover is that a signal strength measurement satisfies a threshold value, and wherein the pre-handover condition is that the signal strength measurement satisfies the threshold value adjusted by an offset value.

In some aspects, the one or more processors are further configured to: provide, by a radio resource control module or a mobility manager module of the UE, a pre-handover indication or a handover start indication to the buffer.

In some aspects, the pre-handover indication or the handover start indication identifies a type of the handover.

In some aspects, the delay used by the buffer is adjusted based at least in part on the pre-handover indication or the handover start indication.

In some aspects, the delay used by the buffer is adjusted to a time value that is based at least in part on an estimated handover interruption time associated with the handover.

In some aspects, the one or more packets of the buffer are processed, based at least in part on the adjustment of the delay, for a duration of a timer.

In some aspects, the one or more packets of the buffer are processed, based at least in part on the adjustment of the delay, until an indication of an occurrence of a handover conclusion.

In some aspects, the indication of the occurrence of the handover conclusion is based at least in part on one or more of a sensor input or an output of a machine learning model.

In some aspects, the indication of the occurrence of the handover conclusion includes one or more of: a satisfaction of a pre-handover cancel condition, a handover completion, or a handover failure.

In some aspects, the pre-handover cancel condition is based at least in part on a condition for exiting a triggered measurement reporting or handover.

In some aspects, the condition for exiting the triggered measurement reporting or handover is that a signal strength measurement satisfies a threshold value, and wherein the pre-handover cancel condition is that the signal strength measurement satisfies the threshold value adjusted by an offset value.

In some aspects, the one or more processors are further configured to: provide, by a radio resource control module or a mobility manager module of the UE, a pre-handover cancel indication, a handover end indication, or a handover failure indication to the buffer.

In some aspects, the delay used by the buffer is used without adjustment based at least in part on the pre-handover cancel indication, the handover end indication, or the handover failure indication.

In some aspects, a UE for wireless communication includes a memory and one or more processors coupled to the memory, the one or more processors configured to: determine that a delay used by a buffer is to be adjusted based at least in part on a handover rate; adjust the delay used by the buffer based at least in part on the determination that the delay used by the buffer is to be adjusted; and process one or more packets of the buffer based at least in part on the adjustment of the delay used by the buffer.

In some aspects, the adjustment of the delay is an increase of the delay.

In some aspects, the delay used by the buffer is adjusted based at least in part on the handover rate of the UE satisfying a threshold value for entering a delay adjustment time window.

In some aspects, the one or more packets of the buffer are processed, based at least in part on the adjustment of the delay, until the handover rate of the UE satisfies a threshold value for exiting a delay adjustment time window.

In some aspects, the delay used by the buffer is adjusted to a time value that is based at least in part on one or more estimated handover interruption times for handover types that are possible from a radio access technology used by a source cell for the UE.

In some aspects, the delay used by the buffer is adjusted to a time value that is based at least in part on one or more observed handover interruption times.

In some aspects, an apparatus for wireless communication includes means for identifying an indication of an occurrence of a handover; means for adjusting a delay used by a buffer based at least in part on the indication of the occurrence of the handover; and means for processing one or more packets of the buffer based at least in part on the adjustment of the delay used by the buffer.

In some aspects, the adjustment of the delay is an increase of the delay.

In some aspects, the indication of the occurrence of the handover is based at least in part on one or more of a sensor input or an output of a machine learning model.

In some aspects, the indication of the occurrence of the handover includes one or more of: a satisfaction of a pre-handover condition, a handover command, or a handover trigger.

In some aspects, the pre-handover condition is based at least in part on a condition for triggering measurement reporting or handover.

In some aspects, the condition for triggering measurement reporting or handover is that a signal strength measurement satisfies a threshold value, and wherein the pre-handover condition is that the signal strength measurement satisfies the threshold value adjusted by an offset value.

In some aspects, the apparatus includes means for providing, by a radio resource control module or a mobility manager module of the apparatus, a pre-handover indication or a handover start indication to the buffer.

In some aspects, the pre-handover indication or the handover start indication identifies a type of the handover.

In some aspects, the delay used by the buffer is adjusted based at least in part on the pre-handover indication or the handover start indication.

In some aspects, the delay used by the buffer is adjusted to a time value that is based at least in part on an estimated handover interruption time associated with the handover.

In some aspects, the one or more packets of the buffer are processed, based at least in part on the adjustment of the delay, for a duration of a timer.

In some aspects, the one or more packets of the buffer are processed, based at least in part on the adjustment of the delay, until an indication of an occurrence of a handover conclusion.

In some aspects, the indication of the occurrence of the handover conclusion is based at least in part on one or more of a sensor input or an output of a machine learning model.

In some aspects, the indication of the occurrence of the handover conclusion includes one or more of: a satisfaction of a pre-handover cancel condition, a handover completion, or a handover failure.

In some aspects, the pre-handover cancel condition is based at least in part on a condition for exiting a triggered measurement reporting or handover.

In some aspects, the condition for exiting the triggered measurement reporting or handover is that a signal strength measurement satisfies a threshold value, and wherein the pre-handover cancel condition is that the signal strength measurement satisfies the threshold value adjusted by an offset value.

In some aspects, the apparatus includes means for providing, by a radio resource control module or a mobility manager module of the UE, a pre-handover cancel indication, a handover end indication, or a handover failure indication to the buffer.

In some aspects, the delay used by the buffer is used without adjustment based at least in part on the pre-handover cancel indication, the handover end indication, or the handover failure indication.

In some aspects, an apparatus for wireless communication includes means for determining that a delay used by a buffer is to be adjusted based at least in part on a handover rate; means for adjusting the delay used by the buffer based at least in part on the determination that the delay used by the buffer is to be adjusted; and means for processing one or more packets of the buffer based at least in part on the adjustment of the delay used by the buffer.

In some aspects, the adjustment of the delay is an increase of the delay.

In some aspects, the delay used by the buffer is adjusted based at least in part on the handover rate of the apparatus satisfying a threshold value for entering a delay adjustment time window.

In some aspects, the one or more packets of the buffer are processed, based at least in part on the adjustment of the delay, until the handover rate of the apparatus satisfies a threshold value for exiting a delay adjustment time window.

In some aspects, the delay used by the buffer is adjusted to a time value that is based at least in part on one or more estimated handover interruption times for handover types that are possible from a radio access technology used by a source cell for the apparatus.

In some aspects, the delay used by the buffer is adjusted to a time value that is based at least in part on one or more observed handover interruption times.

In some aspects, a non-transitory computer-readable medium storing a set of instructions for wireless communication includes one or more instructions that, when executed by one or more processors of a UE, cause the UE to: identify an indication of an occurrence of a handover; adjust a delay used by a buffer based at least in part on the indication of the occurrence of the handover; and process one or more packets of the buffer based at least in part on the adjustment of the delay used by the buffer.

In some aspects, the adjustment of the delay is an increase of the delay.

In some aspects, the indication of the occurrence of the handover is based at least in part on one or more of a sensor input or an output of a machine learning model.

In some aspects, the indication of the occurrence of the handover includes one or more of: a satisfaction of a pre-handover condition, a handover command, or a handover trigger.

In some aspects, the pre-handover condition is based at least in part on a condition for triggering measurement reporting or handover.

In some aspects, the condition for triggering measurement reporting or handover is that a signal strength measurement satisfies a threshold value, and wherein the pre-handover condition is that the signal strength measurement satisfies the threshold value adjusted by an offset value.

In some aspects, the one or more instructions further cause the UE to: provide, by a radio resource control module or a mobility manager module of the UE, a pre-handover indication or a handover start indication to the buffer.

In some aspects, the pre-handover indication or the handover start indication identifies a type of the handover.

In some aspects, the delay used by the buffer is adjusted based at least in part on the pre-handover indication or the handover start indication.

In some aspects, the delay used by the buffer is adjusted to a time value that is based at least in part on an estimated handover interruption time associated with the handover.

In some aspects, the one or more packets of the buffer are processed, based at least in part on the adjustment of the delay, for a duration of a timer.

In some aspects, the one or more packets of the buffer are processed, based at least in part on the adjustment of the delay, until an indication of an occurrence of a handover conclusion.

In some aspects, the indication of the occurrence of the handover conclusion is based at least in part on one or more of a sensor input or an output of a machine learning model.

In some aspects, the indication of the occurrence of the handover conclusion includes one or more of: a satisfaction of a pre-handover cancel condition, a handover completion, or a handover failure.

In some aspects, the pre-handover cancel condition is based at least in part on a condition for exiting a triggered measurement reporting or handover.

In some aspects, the condition for exiting the triggered measurement reporting or handover is that a signal strength measurement satisfies a threshold value, and wherein the pre-handover cancel condition is that the signal strength measurement satisfies the threshold value adjusted by an offset value.

In some aspects, the one or more instructions further cause the UE to: provide, by a radio resource control module or a mobility manager module of the UE, a pre-handover cancel indication, a handover end indication, or a handover failure indication to the buffer.

In some aspects, the delay used by the buffer is used without adjustment based at least in part on the pre-handover cancel indication, the handover end indication, or the handover failure indication.

In some aspects, a non-transitory computer-readable medium storing a set of instructions for wireless communication includes one or more instructions that, when executed by one or more processors of a UE, cause the UE to: determine that a delay used by a buffer is to be adjusted based at least in part on a handover rate; adjust the delay used by the buffer based at least in part on the determination that the delay used by the buffer is to be adjusted; and process one or more packets of the buffer based at least in part on the adjustment of the delay used by the buffer.

In some aspects, the adjustment of the delay is an increase of the delay.

In some aspects, the delay used by the buffer is adjusted based at least in part on the handover rate of the UE satisfying a threshold value for entering a delay adjustment time window.

In some aspects, the one or more packets of the buffer are processed, based at least in part on the adjustment of the delay, until the handover rate of the UE satisfies a threshold value for exiting a delay adjustment time window.

In some aspects, the delay used by the buffer is adjusted to a time value that is based at least in part on one or more estimated handover interruption times for handover types that are possible from a radio access technology used by a source cell for the UE.

In some aspects, the delay used by the buffer is adjusted to a time value that is based at least in part on one or more observed handover interruption times.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
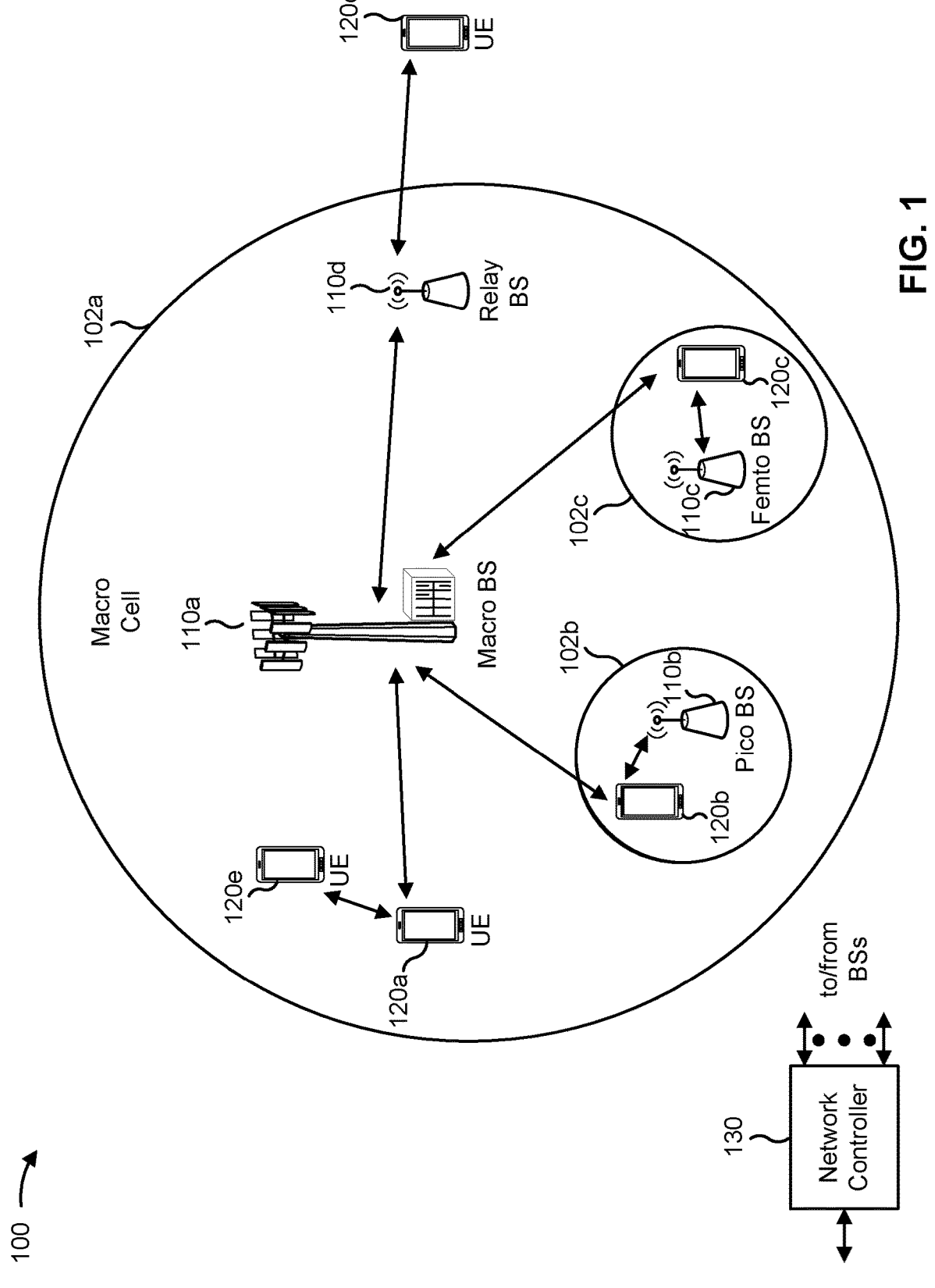
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
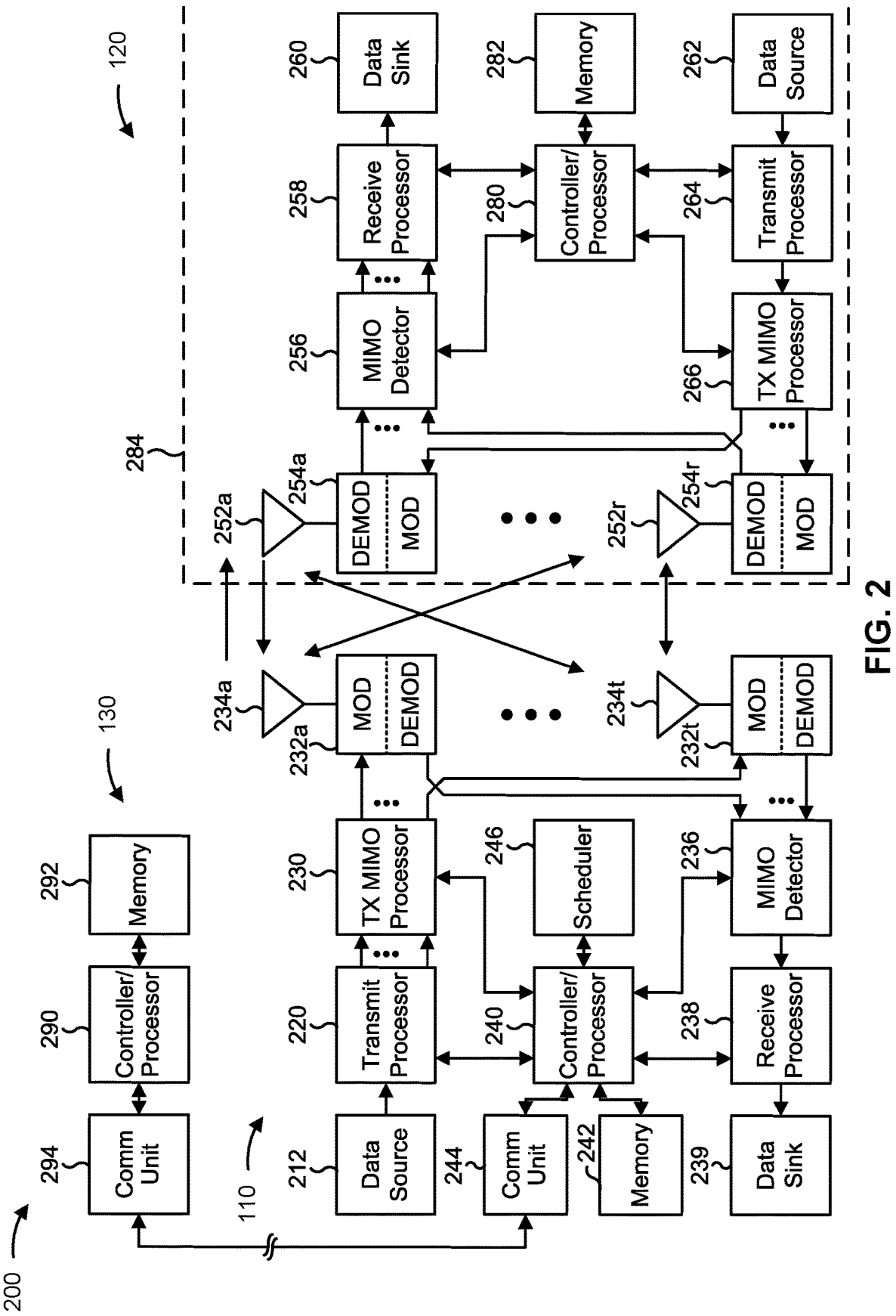
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with buffer adjustment for handover, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions.

In some aspects, the UE includes means for identifying an indication of an occurrence of a handover; means for adjusting a delay used by a buffer based at least in part on the indication of the occurrence of the handover; and/or means for processing one or more packets of the buffer based at least in part on the adjustment of the delay used by the buffer.

In some aspects, the UE includes means for providing, by a radio resource control module or a mobility manager module of the UE, a pre-handover indication or a handover start indication to the buffer. In some aspects, the UE includes means for providing, by a radio resource control module or a mobility manager module of the UE, a pre-handover cancel indication, a handover end indication, or a handover failure indication to the buffer.

In some aspects, the UE includes means for determining that a delay used by a buffer is to be adjusted based at least in part on a handover rate; means for adjusting the delay used by the buffer based at least in part on the determination that the delay used by the buffer is to be adjusted; and/or means for processing one or more packets of the buffer based at least in part on the adjustment of the delay used by the buffer. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
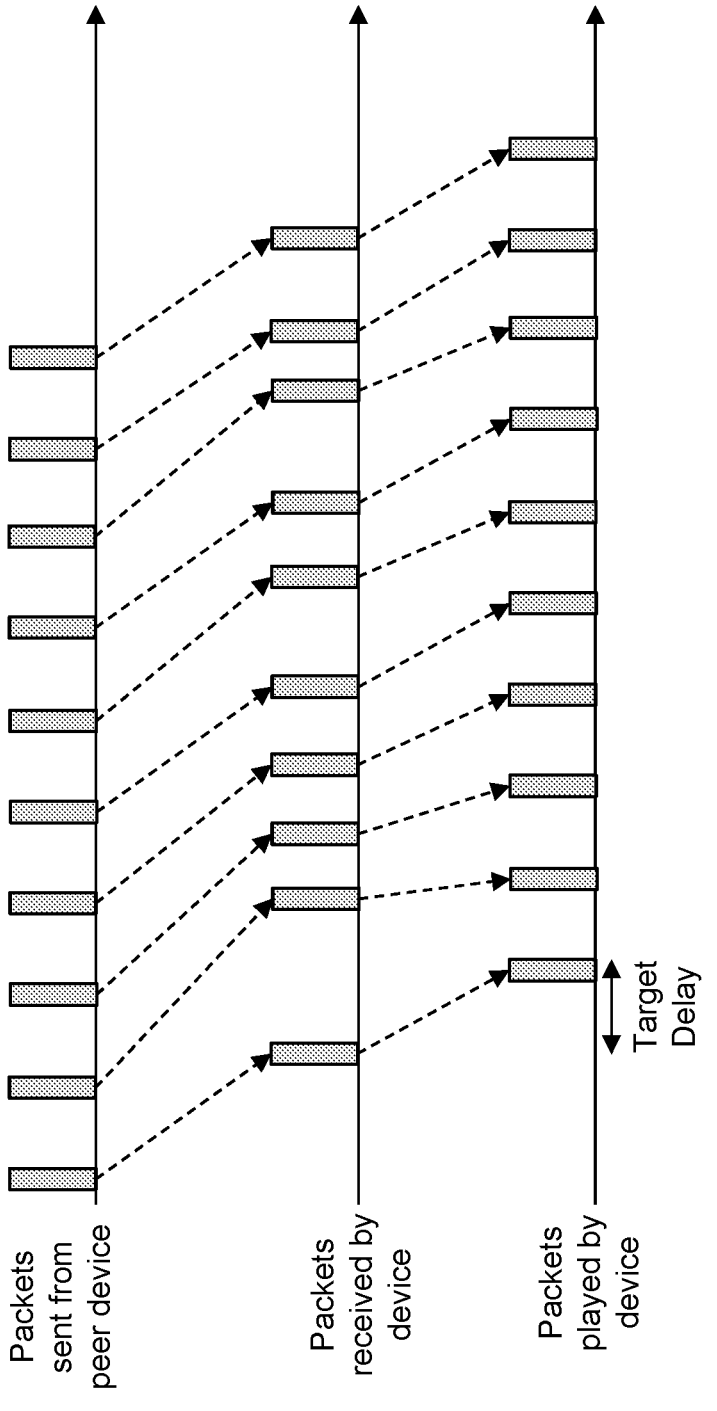
FIG. 3 is a diagram illustrating an example of jitter buffering, in accordance with the present disclosure.

FIG. 3 is a diagram illustrating an example 300 of jitter buffering, in accordance with the present disclosure.

Packets, such as real-time transport protocol (RTP) packets, may be transmitted in a network with time-varying delay. The time-varying delay may be referred to as "network jitter" or "jitter." Due to jitter, packets may be reordered, lost, or duplicated. Moreover, jitter can result in a situation where a playback utility of a device is ready to play a packet, but no packet is present for playback (referred to as "erasure" or "underflow"). In voice or video calling, underflow causes severe degradation of voice or video quality.

A jitter buffer (also known as a "de jitter buffer") of a device may store RTP packets received from a network and prepare the RTP packets for feeding to an audio decoder of the device in a correct order such that a user is not aware of jitter. However, as a size of a jitter buffer increases, end-to-end delay between devices communicating via the network may also increase, which can be perceived as degraded voice quality. Thus, the perceived quality of a voice call may be represented by a frequency or duration of underflows and/or an amount of end-to-end delay.

In some examples, an adaptive jitter buffer design may be used. The goal of an adaptive jitter buffer design is to find an optimal buffer size, which may be referred to as a "target delay value." A target delay value may provide a balance between underflows and end-to-end delay based on particular network conditions. As shown in FIG. 3, a peer device (e.g., a UE) may send packets at regular intervals. However, a device (e.g., a UE) may receive the packets at irregular intervals. The device may buffer the packets for a target delay so that the device can process (e.g., play) the packets at regular intervals.

As indicated above, FIG. 3 is provided as an example. Other examples may differ from what is described with respect to FIG. 3.

Figure 4A:
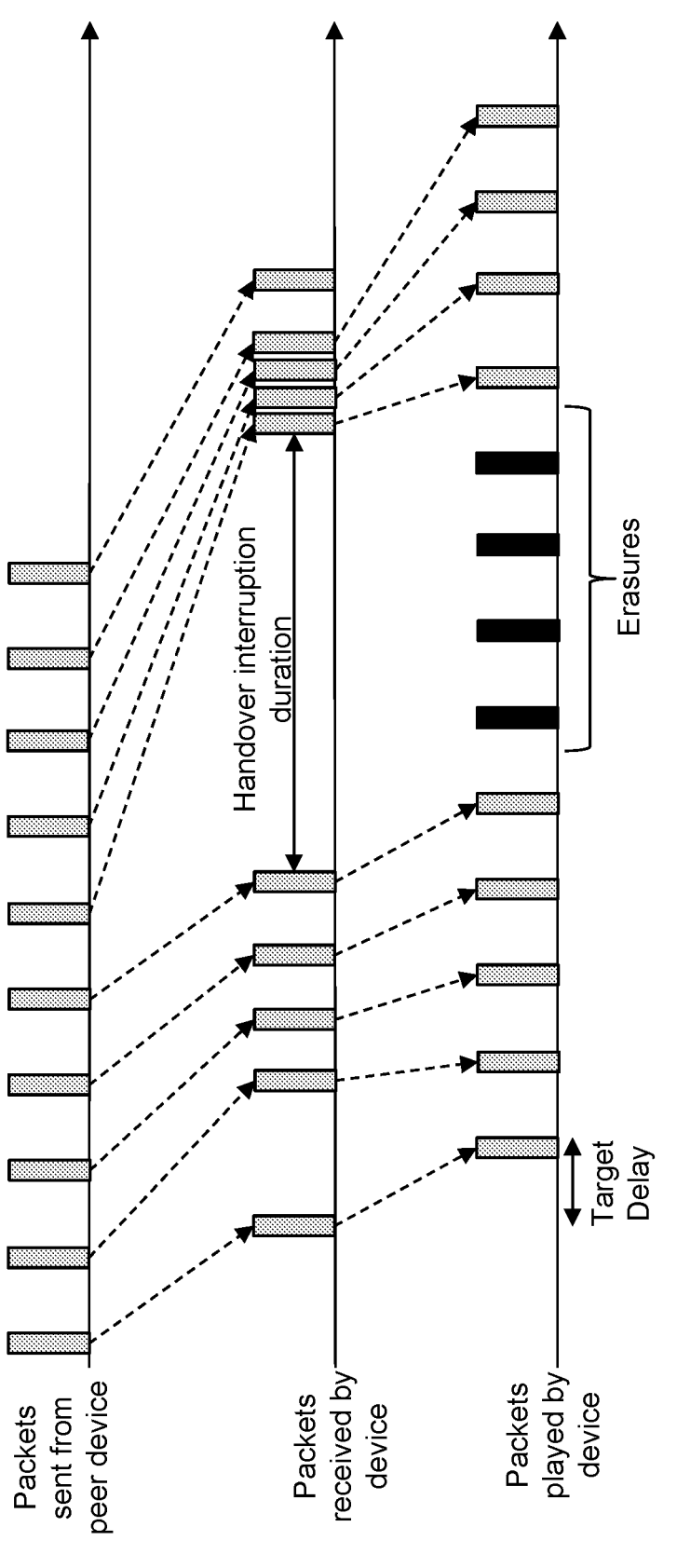
FIG. 4A is a diagram illustrating an example of jitter buffering, in accordance with the present disclosure.

FIG. 4A is a diagram illustrating an example 400 of jitter buffering, in accordance with the present disclosure.

A jitter buffer, as described above, may be useful for handling steady-state network jitter. However, current jitter buffer designs may fail to avoid underflows during abnormal channel delays. In some examples, abnormal channel delays may occur during handover events (e.g., intra-RAT handover or inter-RAT handover). During handover events, jitter values for a channel can be significantly higher than an average jitter value for the channel. Moreover, the jitter can be especially pronounced for a high-mobility user (e.g., a user traveling on a train, bus, or car). "Handover" may refer to a process in which a voice or data session of a UE is transferred from one cell (e.g., a base station) to another cell (e.g., a base station) without disconnecting the session.

As shown in FIG. 4A, a peer device (e.g., a UE) may send packets at regular intervals, and a device (e.g., a UE) may receive the packets at irregular intervals, as described above. During a handover event, the device does not receive packets. The time period during which the device does not receive packets due to a handover event may be referred to as a "handover interruption time" or a "handover interruption duration." The device may buffer the packets for a target delay so that the device can process (e.g., play) the packets at regular intervals. However, due to the handover interruption duration, the target delay may be insufficient to enable the device to process (e.g., play) the packets at regular intervals. Thus, an interruption in packets received at a device due to handover may result in one or more packet erasures.

Some techniques and apparatuses described herein facilitate prediction of occurrences of handover to enable adjustment of a buffer depth and a target delay value for a buffer (e.g., a jitter buffer). A degree of the adjustment may be sufficient to reduce or eliminate underflows that occur during handover. In other time instances, in which handover is not occurring, normal target delay values for reducing end-to-end delay may be used for the buffer (e.g., the target delay values may be unadjusted).

In some aspects, a UE may identify an indication of an occurrence of a handover. In some aspects, a UE may determine that a handover rate of the UE is higher than a threshold value. The UE may adjust a delay used by a buffer based at least in part on the indication of the occurrence of the handover and/or the determination that the handover rate of the UE is higher than the threshold value. In some aspects, the delay may correspond to an expected handover interruption time associated with the handover. In this way, the delay used by the buffer may be optimized for handover. In particular, the delay may be adjusted so as to reduce or eliminate packet underflows that may occur during a handover event. Accordingly, the performance of voice calls or other data streaming may be improved at the UE. For example, the UE may experience less degradation of voice calls.

As indicated above, FIG. 4A is provided as an example. Other examples may differ from what is described with respect to FIG. 4A.

Figure 4B:
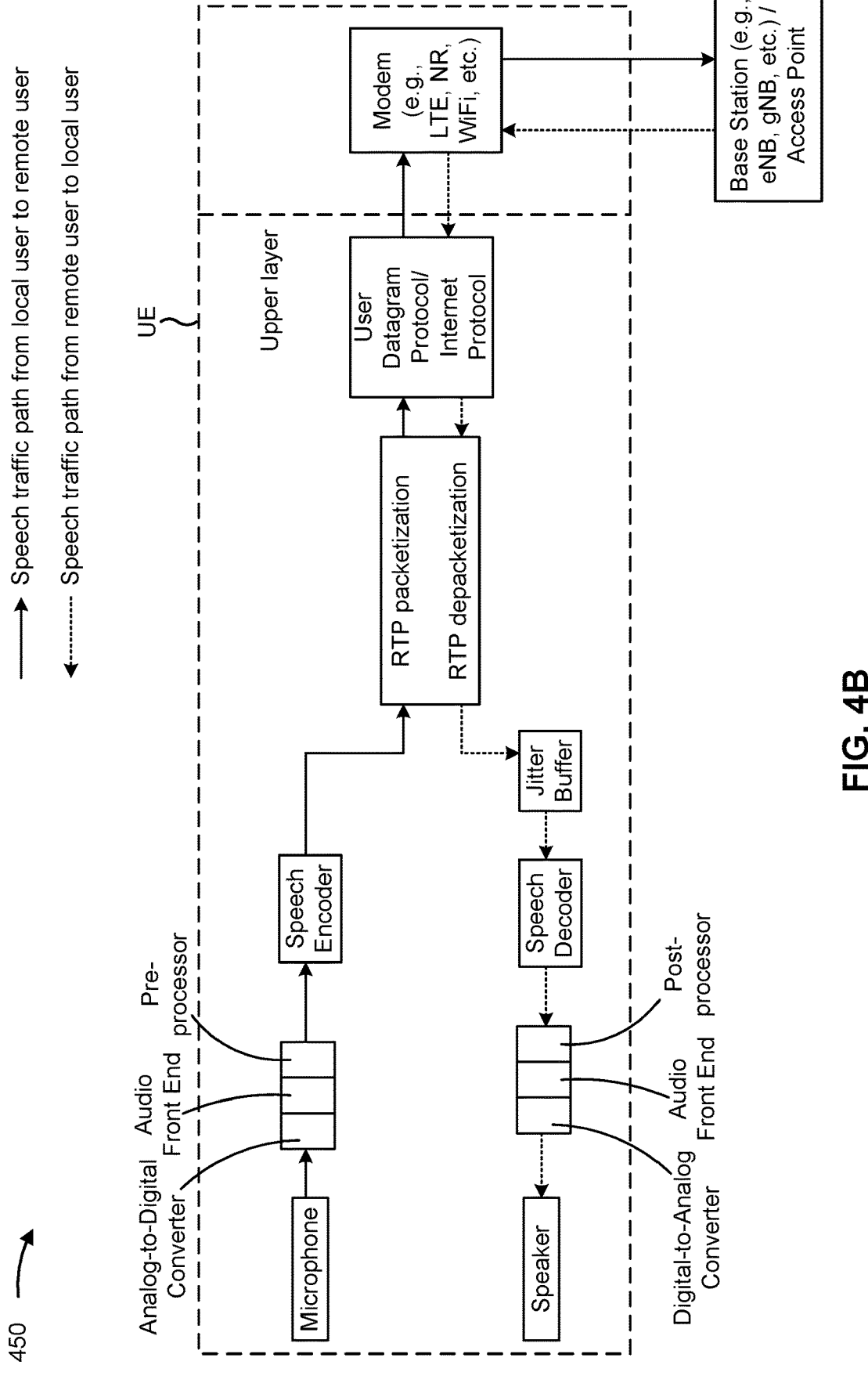
FIG. 4B is a diagram illustrating an example communication system of a UE, in accordance with the present disclosure.

FIG. 4B is a diagram illustrating an example communication system 450 of a UE (e.g., UE 120), in accordance with the present disclosure. In particular, FIG. 4B depicts a packet-switched voice communication system of the UE.

Voice quality (e.g., according to a mean opinion score (MOS), evaluated subjectively or objectively) and mouth-to-ear delay (or end-to-end delay) are key user experience indicators of a conversational service. The mouth-to-ear delay of a voice over internet protocol (VoIP) packet may refer to the time from generation of the packet at the source (e.g., the mouth of the local user) to when the packet reaches a destination (e.g., the ear of the peer user). In a packet-switched communication system, such as LTE, a 5G system, WiFi (which may be used interchangeably with "wireless local area network" (WLAN) herein), or the like, the delay for packets to travel from source to destination varies, resulting in packet arrival jitter, as described above. In order to smoothly play out the far end voice to the listener, a jitter buffer (e.g., an adaptive jitter buffer) is inserted in the communication system before a speech decoder on a receive side of the communication system, as shown in FIG. 4B. As shown in FIG. 4B, the jitter buffer may be associated with an upper layer of the UE, while a modem of the communication system may be associated with a lower layer of the UE.

As described above, the jitter buffer delays the decoding (e.g., playing out time) of the first received packet of each detected talk spurt for a particular amount of time. Alternatively, the jitter buffer may decode (e.g., play) the first packet of a talk spurt immediately when the packet arrives at the receiver if the number of voice packets in the jitter buffer exceeds a threshold. Each received packet of the same detected talk spurt is decoded (e.g., played) according to a generation time of the packet with respect to a generation time of the first packet of the talk spurt. The delay of the jitter buffer introduced to the first packet of a detected talk spurt (e.g., the target delay) is determined based on the packet arrival jitter characteristics and/or a redundancy recovery rate (e.g., if redundancy is used for a lossy channel condition, or the like) to achieve a balance between the jitter delay and the underflow rate (e.g., the ratio of packets that are received after a desired playout time to the total received packets).

As described above, while the jitter buffer may be sufficient in typical VoIP deployments, the target delay used by a jitter buffer may not provide sufficient communication quality in a handover scenario. In some cases, as described above, handover of the UE may occur in the middle of a talk spurt and packet forwarding (e.g., X2/Xn forwarding) from the source node to the target node is enabled in the handover. However, the handover duration/handover interruption time (e.g., the downlink packet reception gap between the last packet received before the handover and the first packet received after the handover) may be longer than the target delay used for a talk spurt (e.g., the user perceives interrupted speech and user experience is degraded). In some cases, a handover of the UE may occur during an active call, and packet forwarding from the source node to the target node is not activated in the handover or the forwarding is activated but the handover duration is longer than a packet data convergence protocol (PDCP) discard timer. Here, all downlink speech frames during handover and/or downlink speech frames in a PDCP buffer older than the PDCP discard timer are lost (e.g., the user perceives interrupted speech from the remote user during the handover). In some cases, an inter-RAT handover of the UE between WiFi and a cellular radio access network (RAN), or an intra-RAT handover of the UE between WiFi, may occur in the middle of an active call. Here, audio frames during the handover may be dropped.

In some examples, voice over NR may be deployed. Due to an NR cell having smaller coverage relative to an LTE cell or an earlier generation cell, inter-RAT handover (e.g., voice over NR to voice over LTE handover) and intra-RAT handover (e.g., voice over NR to voice over NR handover) may occur more frequently. Accordingly, users may experience significant audio interruption.

In some techniques and apparatuses described herein, a modem of a UE may provide various handover indications to an upper layer of the UE. The upper layer may use an indication to improve voice quality in a handover scenario. For example, the upper layer may use the indication to adjust a delay used by a buffer of the UE, as described above. In some aspects, the delay may be adjusted to a time value that is based at least in part on a type of the handover.

In some aspects, for example during a voice call, the modem may provide the upper layer with current RAT information (e.g., information identifying a RAT currently being used by the UE). As described above, the modem may also provide the upper layer with handover-related indications (e.g., immediately upon triggering of the indications).

In some aspects, an indication may indicate that handover is likely to occur (which may be referred to as a pre-handover indication). This indication may also identify a type of the handover. The type of handover identified may be "unknown;" however, the modem may later provide an update to the upper layer if the type of handover is subsequently determined. Moreover, the modem may provide an update to the upper layer if the type of handover is different than a type previously indicated by the modem.

In some aspects, an indication may indicate that conditions on a current RAT improved (e.g., above a threshold) after a pre-handover indication was provided (which may be referred to as a handover reversion or a pre-handover cancel). In some aspects, an indication may indicate that the modem received a handover command (e.g., for handover between wireless wide area networks (WWANs)) or that the UE initiated handover (e.g., between a WWAN and a WLAN) (which may be referred to as a handover start indication). This indication may also identify an actual handover type of the handover. In some aspects, an indication may indicate that the handover failed (which may be referred to as a handover failure indication). In some aspects, an indication may indicate that the handover is complete (e.g., the UE transmitted a message indicating completion of the handover), which may be referred to as a handover completion indication.

In some aspects, if traffic (e.g., audio traffic) must be transmitted over a dedicated bearer, an indication may indicate receipt by the UE of a dedicated bearer (e.g., an audio dedicated bearer) deactivation after the handover (which may be referred to as a dedicated bearer lost indication). In some aspects, if traffic (e.g., audio traffic) must be transmitted over a dedicated bearer, an indication may indicate receipt by the UE of a dedicated bearer (e.g., an audio dedicated bearer) reactivation after the handover (which may be referred to as a dedicated bearer activation indication).

As indicated above, FIG. 4B is provided as an example. Other examples may differ from what is described with respect to FIG. 4B.

Figure 5:
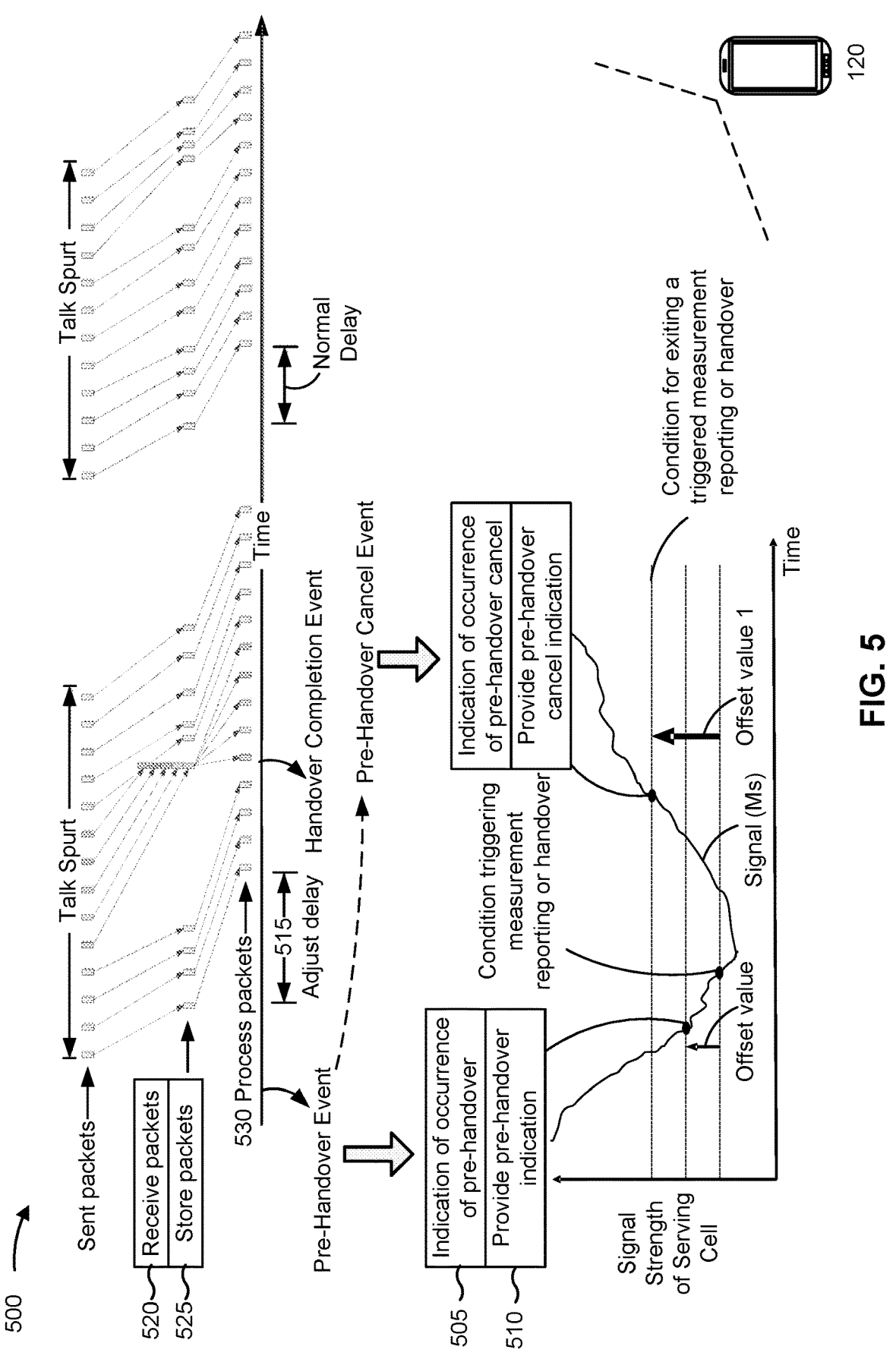
FIGS. 5-6 are diagrams illustrating examples associated with buffer adjustment for handover, in accordance with the present disclosure.

FIG. 5 is a diagram illustrating an example 500 associated with buffer adjustment for handover, in accordance with the present disclosure. As shown in FIG. 5, example 500 includes a UE 120. In some aspects, the UE 120 may be included in a wireless network, such as wireless network 100. For example, the UE 120 may communicate with a base station via a wireless access link, which may include an uplink and a downlink. As another example, the UE 120 may communicate with another UE via a sidelink.

In some aspects, the UE 120 may store packets received by the UE 120 in a buffer (e.g., in a packet buffer). For example, the UE 120 may store the packets in a jitter buffer, as described above. The packets may be processed from the buffer according to a delay (e.g., a target delay), as described above. The delay may be associated with a time value (e.g., a time duration) or may be associated with a number of RTP packets. In some aspects, the UE 120 may use a normal delay value for the buffer (e.g., during time periods that are not associated with a handover event). That is, the UE 120 may use an unadjusted delay value (e.g., relative to the normal target delay value) for the buffer.

As shown by reference number 505, the UE 120 may identify an indication of an occurrence of a handover (e.g., a handover event indicative of handover). For example, the UE 120, using a handover module, may identify the indication of the occurrence of the handover. In some aspects, the handover module may be a radio resource control (RRC) module of the UE 120 (e.g., if the handover is inter-WWAN handover, for example, LTE to LTE handover, LTE to NR handover, or NR to NR handover). In some aspects, the handover module may be a mobility manager module of the UE 120 (e.g., if the handover involves a WLAN, for example, LTE to WLAN handover, NR to WLAN handover, or WLAN to WLAN handover).

In some aspects, the indication of the occurrence of the handover may be the satisfaction of a pre-handover condition (as shown in FIG. 5). Satisfaction of the pre-handover condition may indicate that a handover of the UE 120 is likely to occur within a threshold duration (e.g., the handover is about to occur). In some aspects, the pre-handover condition may be based at least in part on a condition for triggering measurement reporting or handover by the UE 120 (as shown in FIG. 5). For example, the condition may be associated with an A1 handover event (e.g., a signal of a serving cell becomes better than a threshold value), an A2 handover event (e.g., a signal of a serving cell becomes worse than a threshold value), an A3 handover event (e.g., a signal of a neighbor cell becomes better, by an offset, than a signal of a special cell (SpCell)), an A4 handover event (e.g., a signal of a neighbor cell becomes better than a threshold value), an A5 handover event (e.g., a signal of an SpCell becomes worse than a threshold value and a signal of a neighbor cell becomes better than a threshold value), an A6 handover event (e.g., a signal of a neighbor cell becomes better, by an offset, than a signal of a secondary cell (SCell)), a B1 handover event (e.g., a signal of an inter-RAT neighbor cell becomes better than a threshold value), a B2 handover event (e.g., a signal of a primary cell (PCell) becomes worse than a threshold value and a signal of an inter-RAT neighbor cell becomes better than a threshold value), or the like.

In some aspects, the condition for triggering measurement reporting or handover is that a signal strength measurement satisfies a threshold value (e.g., a signal strength threshold). In some aspects, the UE 120 (e.g., using the handover module) may determine whether the pre-handover condition is satisfied by applying an offset value (as shown in FIG. 5) to the threshold value used for triggering measurement reporting or handover (e.g., the offset value is applied to the condition for triggering measurement reporting or handover).

In one example, the condition for triggering measurement reporting or handover is that a signal strength measurement for a serving cell is less than a threshold value (ServingCell$_{Measurement}$<threshold value). Here, the UE 120 (e.g., using the handover module) may determine that the pre-handover condition is satisfied if the signal strength measurement for the serving cell is less than a difference (or sum) of the threshold value and an offset value (ServingCell$_{Measurement}$<threshold value+offset value).

In another example, the condition for triggering measurement reporting or handover is that a signal strength measurement for a target cell is greater than a threshold value (TargetCell$_{Measurement}$>threshold value). Here, the UE 120 (e.g., using the handover module) may determine that the pre-handover condition is satisfied if the signal strength measurement for the target cell is greater than a difference of the threshold value and an offset value (TargetCell$_{Measurement}$>threshold value−offset value).

In a further example, the condition for triggering measurement reporting or handover is that a signal strength measurement for a serving cell is less than a first threshold value (ServingCell$_{Measurement}$<threshold value 1) and a signal strength measurement for a target cell is greater than a second threshold value (TargetCell$_{Measurement}$>threshold value 2). Here, the UE 120 (e.g., using the handover module) may determine that the pre-handover condition is satisfied if the signal strength measurement for the serving cell is less than a difference (or sum) of the first threshold value and a first offset value (ServingCell$_{Measurement}$<threshold value 1+offset value 1) and if the signal strength measurement for the target cell is greater than a difference of the second threshold value and a second offset value (TargetCell$_{Measurement}$ threshold value 2−offset value 2).

In some aspects, the indication of the occurrence of the handover may be a handover start event. The handover start event may be an initiation of a handover of the UE 120. For example, the UE 120 may receive, from a base station, a handover command (e.g., based at least in part on a measurement report of the UE 120) that initiates handover of the UE 120. As another example, the UE 120 may determine to initiate handover (e.g., without a handover command from the base station) based at least in part on satisfaction of the condition for triggering measurement reporting or handover (which in this example would be a condition for triggering handover).

In some aspects, the indication of the occurrence of the handover event may be a prediction that handover is likely to occur. For example, the UE 120 may identify the indication of the occurrence of the handover event based at least in part on an output of a machine learning model. In some aspects, the machine learning model may be trained to predict when a handover of the UE 120 is likely to occur. For example, the machine learning model may be trained on historical data (e.g., associated with the UE 120 and/or one or more other UEs) relating to signal strength, UE mobility (e.g., high mobility, low mobility, or the like), and/or network configuration, among other examples. In some aspects, the UE 120 may input, to the machine learning model, information identifying a signal strength and/or a mobility of the UE 120, and the machine learning model may output a prediction of whether handover is likely to occur. In some aspects, the UE 120 may determine the mobility of the UE 120 using one or more sensors of the UE 120 (e.g., an accelerometer). Thus, the UE 120 may identify the indication of the occurrence of the handover based at least in part on a combination of sensor inputs and the machine learning model.

As shown by reference number 510, the UE 120 may provide, using the handover module, a handover indication (e.g., of a handover event) to the buffer (e.g., to an internet protocol (IP) multimedia subsystem (IMS) that implements the buffer). For example, the UE 120 may provide the handover indication based at least in part on identifying the indication of the occurrence of the handover, as described above. In some aspects, the handover indication is a pre-handover indication that indicates the satisfaction of the pre-handover condition (e.g., thereby indicating that handover is likely to occur within a relatively short duration of the indication). Additionally, or alternatively, the handover indication may be a handover start indication that indicates initiation of a handover of the UE 120. In some aspects, the handover indication (e.g., the pre-handover indication) may identify a type of the handover (e.g., LTE to NR handover, NR to NR handover, or the like). In some aspects, the UE 120 may receive a high speed train indication from a network (e.g., in a system information block (SIB), such as a SIB type 2 (SIB2)). Here, the modem of the UE 120 may provide an upper layer of the UE 120 the high speed train indication (e.g., true or false).

As shown by reference number 515, the UE 120 (e.g., using the buffer of the UE 120, such as via the IMS that implements the buffer) may adjust (e.g., update) the delay used by the buffer based at least in part on identifying the indication of the occurrence of the handover. For example, the UE 120 may adjust the delay used by the buffer based at least in part on the handover indication (e.g., the pre-handover indication and/or the handover start indication). In some aspects, the adjustment to the delay used by the buffer may be an increase to the delay (e.g., relative to a normal delay used by the buffer, as described above). In some aspects, the UE 120 may adjust the delay to a time value that is based at least in part on an estimated (e.g., an expected) handover interruption time for the handover. For example, the UE 120 may adjust the delay to a time value that is at least equal to an estimated handover interruption time for the handover. The estimated handover interruption time may be associated with the type of the handover (e.g., a type of intra-WWAN handover, such as LTE to NR, or a type of WLAN handover such as NR to WLAN).

In some aspects, the UE 120 may store, or receive a configuration of, information that identifies handover interruption times for various types of handovers (which may include a generic handover of "unknown" type). For example, the UE 120 may store, or receive a configuration of, a table that identifies associations between a plurality of handover types and a plurality of estimated handover interruption times. Thus, the estimated handover interruption time for the handover may be indicated by the table. The handover types may include intra-RAT handovers and/or inter-RAT handovers. Intra-RAT handovers may include intra-NR handover, intra-LTE handover, intra-WiFi handover, or the like. Inter-RAT handovers may include NR to LTE handover, LTE to NR handover, LTE to 3G or 2G handover, NR to 3G handover, NR to WiFi handover, LTE to WiFi handover, WiFi to NR-A handover, WiFi to NR-B handover, WiFi to LTE handover, or the like.

In some aspects, the handover interruption times for the handover types may be pre-configured (e.g., using a typical or average handover interruption time that is based on field results or other empirical data), may be location-based, and/or may be updated in real time. For example, the estimated handover interruption time for the handover may be based at least in part on a location of the UE (e.g., the table may indicate a first handover interruption time for the handover type when the UE is in a first location and a second handover interruption time for the handover type when the UE is in a second location).

In some aspects, a handover interruption time for the generic handover may be based at least in part on (e.g., may correspond to or be derived from) a maximum handover interruption time among all handover types associated with a current RAT of the UE 120. In some aspects, a handover type may be associated with multiple (e.g., two) handover interruption times. For example, a handover to a WWAN primary secondary cell (PSCell) may be associated with a first handover interruption time for resource reservation and a second handover interruption time for no resource reservation.

Some types of handover may be associated with the same or similar handover interruption times (e.g., the handover procedures have the same or similar durations). For example, an intra-NR handover procedure and an intra-LTE handover procedure may take a similar amount of time to complete. In some cases, a handover interruption time may be direction dependent. For example, the duration of a WiFi to WWAN (e.g., NR or LTE) handover may be smaller than the duration of a WWAN to WiFi handover. In other words, a handover interruption time may be based at least in part on a first radio technology used by a source node for the handover and a second radio technology used by a target node for the handover (e.g., which may be different from a handover interruption time when the source node uses the second radio technology and the target node uses the first radio technology).

In some aspects, the UE 120 may store the information that identifies handover interruption times in connection with an upper layer of the UE 120 (e.g., at the buffer) or in a modem of the UE 120. In cases where the information is stored in the modem, the modem may indicate the handover interruption time to the upper layer in connection with providing a pre-handover indication or a handover start indication to the upper layer.

In some aspects, the UE 120 may adjust the delay used by the buffer (e.g., starting with a subsequent talk spurt) to a time value that is based at least in part on the estimated handover interruption time associated with the handover type of the handover (e.g., indicated by the information stored by the UE 120), a maximum delay that is allowable for the buffer, and/or a normal delay for the buffer (e.g., an unadjusted delay that would be used by the UE 120 if a pre-handover indication or a handover start indication were not received). For example, the UE 120 may adjust the delay in accordance with Equation 1:

$$T_{TD\_A}=\max(\min(T_{HI}+\Delta,T_{MAX\_TD}),T_{TD}) \qquad \text{Equation 1}$$

where $T_{TD\_A}$ is the adjusted target delay, $T_{HI}$ is the estimated handover interruption time associated with the handover type of the handover, $\Delta$ is a value between 0 and a time length of one packet (e.g., one speech packet) such that $T_{HI}+\Delta$ is an integer multiple of a packet (e.g., speech packet) time length, $T_{MAX\_TD}$ is the maximum delay that is allowable for the buffer, and $T_{TD}$ is the normal target delay for the buffer (e.g., which would also be calculated based at least in part on $T_{MAX\_TD}$).

In some aspects, prior to the handover, if the UE 120 receives a subsequent pre-handover indication of a subsequent handover (e.g., the type of handover is updated), the UE 120 may determine a new adjustment for the buffer using Equation 1 (e.g., where $T_{HI}$ corresponds to the handover interruption time associated with a type of handover of the subsequent handover). Moreover, prior to the handover, if the UE 120 receives a pre-handover cancel indication (e.g., indicating that no handover will occur because conditions on the current RAT improved after the pre-handover indication), the UE 120 may adjust the delay used by the buffer back to the normal target delay ($T_{TD}$).

In some aspects (e.g., if the source RAT is a WWAN RAT), upon receipt of a handover start indication following a pre-handover indication, the UE 120 may change the delay used by the buffer back to the normal target delay. Alternatively, upon receipt of a handover start indication following a pre-handover indication, the UE 120 may continue to use the adjusted delay for the buffer if the UE 120 is associated with high mobility (e.g., associated with a high speed train) or if the handover frequency, described below, associated with the UE 120 satisfies a threshold. In some aspects, if a handover failure indication is received by the UE 120 after receipt of a handover start indication, the UE 120 may change the delay used by the buffer back to the normal target delay (or the UE 120 may continue to use the adjusted delay in a high mobility scenario or a frequent handover scenario). In some aspects (e.g., if the source RAT is WiFi), upon receipt of a handover complete indication after receiving a handover start indication, the UE 120 may change the delay used by the buffer back to the normal target delay (or the UE 120 may continue to use the adjusted delay in a frequent handover scenario).

In some aspects, after the UE 120 has adjusted the delay used by the buffer and then returned to the normal target delay, the UE 120 may determine the normal target delay using a particular algorithm. The algorithm for determining the normal target delay, after adjusting the delay, may be the same algorithm that is used before adjusting the delay. However, particular factors used for the algorithm may be ignored after adjusting the delay (e.g., because adjusting the delay may unrealistically alter the factors). For example, statistics relating to underflow, redundancy recovery rate, or the like, of talk spurts after the adjusted delay is used for the buffer, but without actual overlap with the handover, may not be used for determining the normal target delay. As another example, statistics relating to underflow, jitter, redundancy recovery rate, or the like, of talk spurts overlapping with the handover may not be used for determining the normal target delay. In some examples, in a case of videotelephony call handover, a target audio-to-video synchronization error is not updated during the handover.

In some aspects, the UE 120 (e.g., the upper layer of the UE 120) may receive an indication that the UE 120 is associated with a high-speed train, as described above. Here, the UE 120 may continue to adjust the delay used by the buffer using a handover interruption time that is based at least in part on a latest updated high speed train handover duration that maintains a particular gap between talk spurts (e.g., in a case where the handover interruption time is greater than the normal target delay). In some aspects, the UE 120 (e.g., the upper layer of the UE 120) may collect information relating to a frequency of handover of the UE 120. In some aspects, if the frequency of handover satisfies a threshold (e.g., one handover per 20 seconds), the UE 120 may continue to adjust the delay used by the buffer using a handover interruption time that is based at least in part on a latest updated handover duration that maintains a particular gap between talk spurts. In other words, the UE 120 may process packets of the buffer, based at least in part on the adjustment of the delay, following an indication of an occurrence of a handover conclusion, if the UE receives a high-speed train indication or if a handover rate of the UE satisfies a threshold.

In some aspects, based at least in part on receiving a pre-handover indication, the UE 120 may activate and/or update a redundancy offset (e.g., for audio redundancy, packet redundancy, or the like) used by the UE 120 (e.g., an upper layer of the UE 120). That is, the UE 120 may set the redundancy offset based at least in part on identifying the indication of the occurrence of the handover. If redundancy is activated for the UE 120 prior to receiving the pre-handover indication, then the UE 120 may set the redundancy offset based at least in part on statistics relating to received packet loss.

If redundancy is activated for the UE 120 upon receiving the pre-handover indication, then the UE 120 may set the redundancy offset based at least in part on potential packet loss that may occur during handover. In some aspects, the UE 120 may set the redundancy offset based at least in part on a time value to which the delay used by the buffer is adjusted.

For example, if the handover is between cellular RANs, packet forwarding (e.g., X2/Xn forwarding) between a source node and a target node of the handover is activated, and a packet discard timer (e.g., a PDCP discard timer) value is less than the adjusted delay ($T_{TD\_A}$) used for the buffer, then the UE 120 may set the redundancy offset (e.g., subject to a maximum allowable value for the redundancy offset, such as 7 speech frames) to a value that is greater than or equal to a difference between the adjusted delay and the packet discard timer value. As another example, if the handover is between cellular RANs and packet forwarding between a source node and a target node of the handover is not activated, or if the handover is between cellular and WiFi RATs, then the UE 120 may set the redundancy offset (e.g., subject to a maximum allowable value) to a value that is greater than or equal to the adjusted delay ($T_{TD\_A}$) used for the buffer.

If redundancy is not activated for the UE 120 upon receiving the pre-handover indication, then the UE 120 (e.g., an upper layer of the UE 120) may activate redundancy (e.g., audio redundancy). Moreover, in some cases, the UE 120 may set the redundancy offset as described above. For example, the UE 120 may set the redundancy offset as described above if, for a session of the UE 120, a particular codec or mode is negotiated (e.g., enhanced voice services (EVS) 13.2 kilobits per second (kbps) channel aware mode (CAM)) and/or particular packets (e.g., 3GPP RTP control protocol (RTCP)-APP packets, such as redundancy request packets) are negotiated. In some aspects, if the particular codec or mode (e.g., EVS 13.2 kbps CAM) is negotiated, but a bit rate of a current operating codec or mode of the UE 120 is higher than a threshold (e.g., 13.2 kbps), then the UE 120 may switch codec or mode to the particular codec or mode. If the particular codec or mode is not negotiated, then the UE 120 may switch to a codec or mode associated with a bit rate that is less than (e.g., between 45-50% of, such as 50% of) the bit rate of the current operating codec or mode of the UE 120 (e.g., to introduce 100% redundancy).

Prior to an actual handover, if the UE 120 receives a pre-handover cancel indication (e.g., indicating that no handover will occur because conditions on the current RAT improved after the pre-handover indication), then the UE 120 may revert to a codec or mode and/or a redundancy setting used by the UE 120 before receipt of the pre-handover indication. Similarly, if the UE 120 receives a handover complete indication or a handover failure indication, after receipt of a handover start indication, then the UE 120 may revert to a codec or mode and/or a redundancy setting used by the UE 120 before receipt of the pre-handover indication. In a high mobility scenario (e.g., the UE 120 is associated with a high speed train) or a frequent handover scenario, as described below, the UE 120 may refrain from reverting to a codec or mode and/or a redundancy setting used by the UE 120 before receipt of the pre-handover indication (e.g., if packet forwarding between a source node and a target node of the handover is activated but a packet discard timer (e.g., PDCP timer) value is less than the adjusted delay ($T_{TD\_A}$) used for the buffer, or if packet forwarding between a source node and a target node of the handover is not activated).

As shown by reference number 520, the UE 120 may receive packets. For example, the packets may be transmitted by another UE, and the UE 120 may receive the packets from a base station (e.g., via an access link) or from the other UE (e.g., via a sidelink). The packets may be RTP packets. For example, the packets may be associated with a voice call between the UE 120 and the other UE (e.g., the packets may be associated with a talk spurt of the voice call, as shown). As another example, the packets may be associated with streaming traffic (e.g., the packets may be associated with data segments). As shown by reference number 525, the UE 120 may store the packets in the buffer prior to processing the packets. For example, the UE 120 may store the packets in the buffer, prior to processing the packets, for a time period of the adjusted delay.

As shown by reference number 530, the UE 120 may process one or more packets of the buffer based at least in part on the adjusted delay. In other words, the UE 120 may refrain from processing the packets for a time period of the adjusted delay. The UE 120 may process the packets by obtaining the packets from the buffer and providing the packets to a playback utility of the UE 120, an audio decoder of the UE 120, a video decoder of the UE 120, or the like.

In some aspects, the UE 120 may process packets of the buffer, based at least in part on the adjusted delay, for the duration of a timer. In some aspects, after expiration of the timer, the UE 120 may process packets of the buffer using an unadjusted delay (e.g., a normal delay used by the buffer, as described above). For example, the UE 120 (e.g., using the buffer of the UE 120, such as via the IMS that implements the buffer) may update the delay used by the buffer back to the normal delay based at least in part on the expiration of the timer. Thus, the UE 120 may process packets of a subsequent talk spurt, or other data segment, from the buffer using the normal delay.

In some aspects, the UE 120 may identify an indication of an occurrence of a handover conclusion (e.g., a handover event indicative of concluding handover). For example, the UE 120, using the handover module, may identify the indication of the occurrence of the handover conclusion. In some aspects, the UE 120 may process packets of the buffer, based at least in part on the adjusted delay, until the UE 120 identifies the indication of the occurrence of the handover conclusion (as shown in FIG. 5).

In some aspects, the indication of the occurrence of the handover conclusion may be the satisfaction of a pre-handover cancel condition. Satisfaction of the pre-handover cancel condition may indicate that a previously-determined pre-handover condition (and associated pre-handover indication) is no longer valid. In some aspects, the pre-handover cancel condition may be based at least in part on a condition for exiting a triggered measurement reporting or handover of the UE 120 (e.g., a condition for canceling measurement reporting or handover that was triggered, as described above).

In some aspects, the condition for exiting the triggered measurement reporting or handover (as shown in FIG. 5) is that a signal strength measurement satisfies a threshold value (e.g., a signal strength threshold). In some aspects, the UE 120 (e.g., using the handover module) may determine whether the pre-handover cancel condition is satisfied by applying an offset value (as shown in FIG. 5) to the threshold value used for exiting a triggered measurement reporting or handover (e.g., the offset value is applied to the condition for triggering measurement reporting or handover), in a similar manner as described above for the pre-handover condition.

In some aspects, the indication of the occurrence of the handover conclusion may be a handover completion event or a handover failure event. The handover completion event may be a successful completion of a handover of the UE 120 that was started. The handover failure event may be a failure of a handover of the UE 120 that was started (e.g., the handover did not complete successfully).

In some aspects, the indication of the occurrence of the handover conclusion may be a prediction that a triggered measurement reporting or handover is likely to be exited. For example, the UE 120 may identify the indication of the occurrence of the handover conclusion based at least in part on an output of a machine learning model (e.g., the same machine learning model described above or a different machine learning model). In some aspects, the machine learning model may be trained to predict when a triggered measurement reporting or handover is likely to be exited. For example, the machine learning model may be trained on historical data (e.g., associated with the UE 120 and/or one or more other UEs) relating to signal strength, UE mobility, and/or network configuration, among other examples. In some aspects, the UE 120 may input, to the machine learning model, information identifying a signal strength and/or a mobility of the UE 120, and the machine learning model may output a prediction of whether a triggered measurement reporting or handover is likely to be exited. In some aspects, the UE 120 may determine the mobility of the UE 120 using one or more sensors of the UE 120 (e.g., an accelerometer). Thus, the UE 120 may identify the indication of the occurrence of the handover conclusion based at least in part on a combination of sensor inputs and the machine learning model.

In some aspects, the UE 120 may provide, using the handover module, a handover conclusion indication (e.g., of a handover conclusion event) to the buffer (e.g., to an IMS that implements the buffer), in a similar manner as described above. For example, the UE 120 may provide the handover conclusion indication based at least in part on identifying the indication of the occurrence of the handover conclusion, as described above. In some aspects, the handover conclusion indication is a pre-handover cancel indication that indicates the satisfaction of the pre-handover cancel condition (e.g., thereby indicating that a previously provided pre-handover indication is no longer valid). Additionally, or alternatively, the handover conclusion indication may be a handover end indication that indicates completion of a handover of the UE 120 (e.g., based at least in part on the occurrence of a handover completion event). Additionally, or alternatively, the handover conclusion indication may be a handover failure indication that indicates failure of a handover of the UE 120 (e.g., based at least in part on the occurrence of a handover failure event).

In some aspects, the UE 120 may process packets of the buffer using an unadjusted delay (e.g., a normal delay used by the buffer, as described above) based at least in part on identifying the indication of the occurrence of the handover conclusion. For example, the UE 120 (e.g., using the buffer of the UE 120, such as via the IMS that implements the buffer) may update the delay used by the buffer back to the normal delay based at least in part on the handover conclusion indication. Thus, the UE 120 may process packets of a subsequent talk spurt, or other data segment, from the buffer using the normal delay.

In some aspects, the UE 120 may perform offline or real-time updating of handover interruption times (e.g., updating of the information stored by the UE 120 that indicates handover interruption times, as described above). Here, the UE 120 may collect information relating to an arrival time, a sequence number, a timestamp (e.g., an RTP timestamp), RAT information (e.g., the RAT used to receive a packet), or the like, of one or more packets (e.g., audio packets, RTP packets, or the like) received by the UE 120 in connection with a handover. For example, the UE 120 may collect the information (e.g., for each packet) starting with a first packet received by the UE before (e.g., immediately before) or simultaneously with an indication of an occurrence of handover (e.g., a handover start indication) and ending with a second packet that is received by the UE after (e.g., immediately after) an indication of an occurrence of a handover conclusion (e.g., a handover completion indication). In some aspects, the UE 120 may stop collecting the information upon receipt of a handover failure indication after receiving a handover start indication. The information collected by the UE 120 may identify an estimated handover interruption time for a handover type of the handover, as described below.

Based at least in part on the information, the UE 120 may determine an estimate of a handover interruption time associated the handover (e.g., if the handover failure indication is not received after the handover start indication). In some aspects, the UE 120 may determine the estimate of the handover interruption time in connection with the handover occurring during a downlink talk spurt (e.g., which may provide a more accurate estimate).

In connection with the information collected by the UE 120, t-start-recv, sn-recv-start, and ts-recv-start may represent an arrival time, a sequence number, and an RTP timestamp, respectively, of the last audio RTP packet received by the UE 120 on a source node (e.g., a source cell or access point) of the handover. In addition, t-end-recv, sn-recv-complete, and ts-recv-complete may represent an arrival time, a sequence number, and an RTP timestamp, respectively, of the first audio RTP packet received by the UE 120 on a target node (e.g., a target cell or access point) of the handover. In some aspects, the UE 120 may determine the estimate of the handover interruption time if Equation 2 is satisfied.

$$(\text{sn-recv-complete} - \text{sn-recv-start})*_p\text{time} = \text{ts-recv-complete} - \text{ts-recv-start} \qquad \text{Equation 2}$$

where ptime is a time duration of a packet. If Equation 2 is satisfied, the UE 120 may determine an instantaneous handover interruption time (e.g., for the particular handover) according to Equation 3:

$$T_{HI}(\text{inst}) = t\text{-end-recv} - t\text{-start-recv} \qquad \text{Equation 3}$$

where $T_{HI}(\text{inst})$ is the instantaneous handover interruption time. Furthermore, if run-time handover interruption time updating is enabled for the UE 120, then the UE 120 may update the determined handover interruption time according to Equation 4:

$$T_{HI} = \alpha \times T_{HI}(\text{inst}) + (1-\alpha) \times T_{HI} \qquad \text{Equation 4}$$

where $T_{HI}$ is the estimated handover interruption time for the handover type of the handover (as described above), $T_{HI}$(inst) is an instantaneous estimated handover interruption time, and a has a value between 0 and 1. The UE 120 may dynamically determine the value of a based at least in part on a relationship between $T_{HI}$(inst) and $T_{HI}$. For example, a may have a relatively larger value (e.g., near 1) if $T_{HI}$(inst) is greater than or equal to $T_{HI}$, and a may have a relatively smaller value (e.g., near 0.2) if $T_{HI}$(inst) is less than $T_{HI}$.

In some cases, RAT information for a received packet may not be available to an upper layer of the UE 120. Here, the UE 120 may perform offline analysis of a log of received packets in order to estimate the handover interruption time. However, if run-time handover interruption time updating is to be performed by the UE 120, then the UE 120 may determine whether each pair of received packets (i, i+1), received while the UE 120 was collecting the information, satisfies Equation 5:

$$(sn(i+1)-sn(i))*ptime=ts(i+1)-ts(i) \qquad \text{Equation 5}$$

where sn(i) and sn(i+1) are sequence numbers of packets i and i+1, respectively, and ts(i) and ts(i+1) are timestamps of packets i and i+1. If each pair of packets satisfies Equation 5, then the UE 120 may estimate an instantaneous handover interruption time according to Equation 6:

$$T_{HI}(inst)=Max(t\_arrival(i+1)-t\_arrival(i)), \text{ for all}$$
packets $i$ received while the UE 120 was collecting the information       Equation 6 where t_arrival(i) and t_arrival(i+1) are arrival times of packets i and i+1, respectively.

In some aspects, the UE 120 may collect information for use in updating a handover interruption time associated with uplink audio transmission interruption and/or for handover-related signaling statistics. Here, the UE 120 may collect information relating to a time at which a handover start indication for a handover is received and a handover type of the handover. The UE 120 may also collect information relating to a send time, a sequence number, and a timestamp (e.g., an RTP timestamp) of one or more packets (e.g., audio packets, RTP packets, or the like) transmitted by the UE 120 in connection with the handover. For example, the UE 120 may collect the information (e.g., for each packet) starting with a first packet transmitted by the UE before (e.g., immediately before) or simultaneously with a handover start indication and ending with a second packet transmitted by the UE after (e.g., immediately after) a handover complete indication. In some aspects, the UE 120 may stop collecting the information upon receipt of a handover failure indication after receiving a handover start indication.

If the UE 120 receives an indication that an audio dedicated bearer is deactivated, then the UE 120 may also collect information relating to a time that the indication is received. Additionally, after or with receipt of a handover complete indication, if the UE 120 also receives in indication that an audio dedicated bearer is reactivated, then the UE 120 may also collect information relating to a time that the indication is received. The UE 120 may use the collected information to determine an estimated handover interruption time for uplink, in a similar manner as described above, and/or to determine handover-related signaling statistics.

As indicated above, FIG. 5 is provided as an example. Other examples may differ from what is described with respect to FIG. 5.

Figure 6:
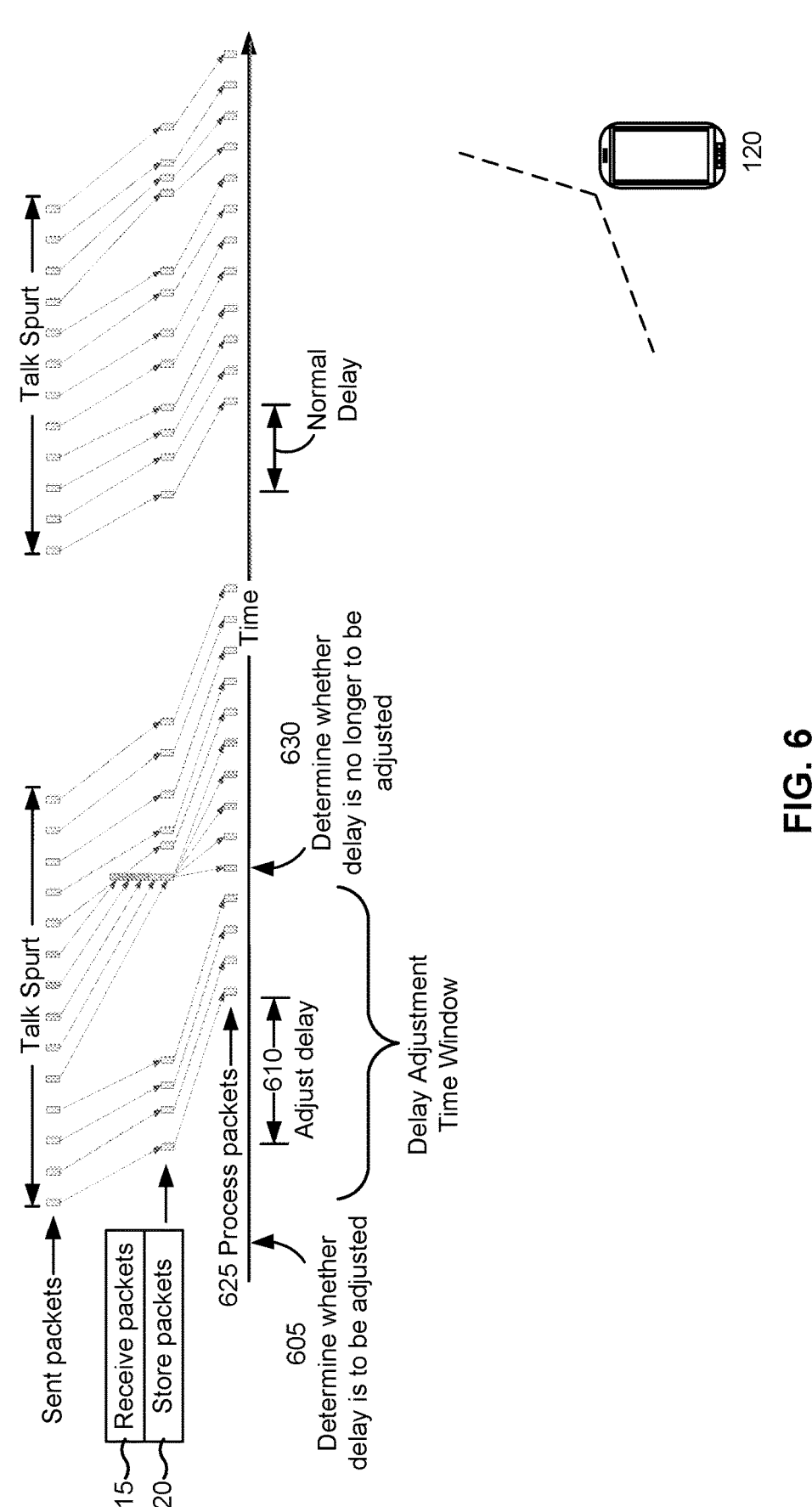

FIG. 6 is a diagram illustrating an example 600 associated with buffer adjustment for handover events, in accordance with the present disclosure. As shown in FIG. 6, example

600 includes a UE 120. In some aspects, the UE 120 may be included in a wireless network, such as wireless network 100. For example, the UE 120 may communicate with a base station via a wireless access link, which may include an uplink and a downlink. As another example, the UE 120 may communicate with another UE via a sidelink.

In some aspects, the UE 120 may store packets received by the UE 120 in a buffer (e.g., in a packet buffer), such as a jitter buffer, as described above. For example, the packets may be processed from the buffer according to a delay (e.g., a target delay), as described above. The delay may be associated with a time value (e.g., a time duration) or a number of RTP packets. In some aspects, the UE 120 may use a normal delay value for the buffer (e.g., during time periods that are not associated with a high handover rate). That is, the UE 120 may use an unadjusted delay value (e.g., relative to the normal target delay value) for the buffer.

As shown by reference number 605, the UE 120 may determine whether the delay used by the buffer is to be adjusted based at least in part on a handover rate (e.g., a number of handover events that occur over a particular time duration; in other words, a frequency of handover events) associated with the UE 120. Based at least in part on a determination that the delay used by the buffer is to be adjusted, the UE 120 may enter a delay adjustment time window (e.g., during which the delay used by the buffer is to be adjusted). In some aspects, the UE 120 may determine that the delay used by the buffer is to be adjusted based at least in part on a determination that the handover rate satisfies (e.g., is greater than) a threshold value (e.g., a threshold value for entering the delay adjustment time window).

In some aspects, the UE 120 may determine that the delay used by the buffer is to be adjusted based at least in part on an output of a machine learning model. In some aspects, the machine learning model may be trained to determine when the handover rate is sufficiently high to adjust the delay. For example, the machine learning model may be trained on historical data (e.g., associated with the UE 120 and/or one or more other UEs) relating to handover rate, mobility patterns, and/or network configuration, among other examples. In some aspects, the UE 120 may input, to the machine learning model, information identifying a handover rate and/or a mobility of the UE 120, and the machine learning model may output an indication of whether the handover rate is sufficiently high to adjust the delay. In some aspects, the UE 120 may determine the mobility of the UE 120 using one or more sensors of the UE 120 (e.g., an accelerometer). Thus, the UE 120 may determine that the delay used by the buffer is to be adjusted based at least in part on a combination of sensor inputs and the machine learning model.

In some aspects, the UE 120 may determine that the delay used by the buffer is to be adjusted based at least in part on an indication of high mobility. In some aspects, the UE 120 may receive an indication (e.g., from a base station) that a current base station connected to the UE 120 belongs to a set of base stations that serve high mobility users. For example, a base station may broadcast an indication of whether the base station supports high mobility users.

As shown by reference number 610, the UE 120 (e.g., using the buffer of the UE 120, such as via the IMS that implements the buffer) may adjust (e.g., update) the delay used by the buffer based at least in part on the handover rate associated with the UE 120. For example, the UE 120 may adjust the delay based at least in part on entering the delay adjustment time window (e.g., when the handover rate satisfies the threshold value). In some aspects, the adjustment to the delay used by the buffer may be an increase to the delay (e.g., relative to a normal delay used by the buffer, as described above).

In some aspects, the UE 120 may adjust the delay to at least a time value that is based at least in part on one or more estimated (e.g., expected) handover interruption times, as described above, for handover types that are possible from a source RAT used by the UE (e.g., a RAT of the source cell for the UE 120). For example, the time value may correspond to a maximum handover interruption time among all handover types that are possible from the source cell. As another example, the time value may correspond to an average handover interruption time for (e.g., observed for) the source cell (e.g., among all handover types for the source cell). As a further example, the time value may correspond to a handover interruption time associated with the handover type that is most likely to occur from the source cell (e.g., based at least in part on previously observed handover types from the source cell).

In some aspects, the UE 120 may adjust the delay to a time value that is based at least in part on one or more observed (e.g., by the UE 120 and/or by another UE) handover interruption times for one or more previous handovers. For example, the UE 120 may adjust the delay to a time value corresponding to a most recently observed handover interruption time, a most commonly observed handover interruption time, an average observed handover interruption time, a maximum observed handover interruption time, or the like.

As shown by reference number 615, the UE 120 may receive packets, in a similar manner as described above. As shown by reference number 620, the UE 120 may store the packets in a buffer prior to processing the packets, in a similar manner as described above.

As shown by reference number 625, the UE 120 may process one or more packets of the buffer based at least in part on the adjusted delay, in a similar manner as described above. As shown by reference number 630, the UE 120 may determine whether the handover rate associated with the UE 120 indicates that the delay used by the buffer is no longer to be adjusted. Based at least in part on a determination that the delay used by the buffer is no longer to be adjusted, the UE 120 may exit the delay adjustment time window (e.g., after which the delay used by the buffer is not to be adjusted). In some aspects, the UE 120 may determine that the delay used by the buffer is to be adjusted based at least in part on a determination that the handover rate satisfies (e.g., is less than) a threshold value (e.g., for exiting the delay adjustment time window). In some aspects, the threshold value for entering the delay adjustment time window and the threshold value for exiting the delay adjustment time window may be the same value or different values.

The UE 120 may process packets of the buffer, based at least in part on the adjusted delay, until exiting the delay adjustment time window (e.g., based at least in part on determining that the handover rate satisfies the threshold value for exiting the delay adjustment time window). The UE 120 (e.g., using the buffer of the UE 120, such as via the IMS that implements the buffer) may update the delay used by the buffer back to the normal delay (as shown in FIG. 6) based at least in part on exiting the delay adjustment time window. Thus, the UE 120 may process packets of a subsequent talk spurt, or other data segment, from the buffer using the normal delay.

As indicated above, FIG. 6 is provided as an example. Other examples may differ from what is described with respect to FIG. 6.

Figure 7:
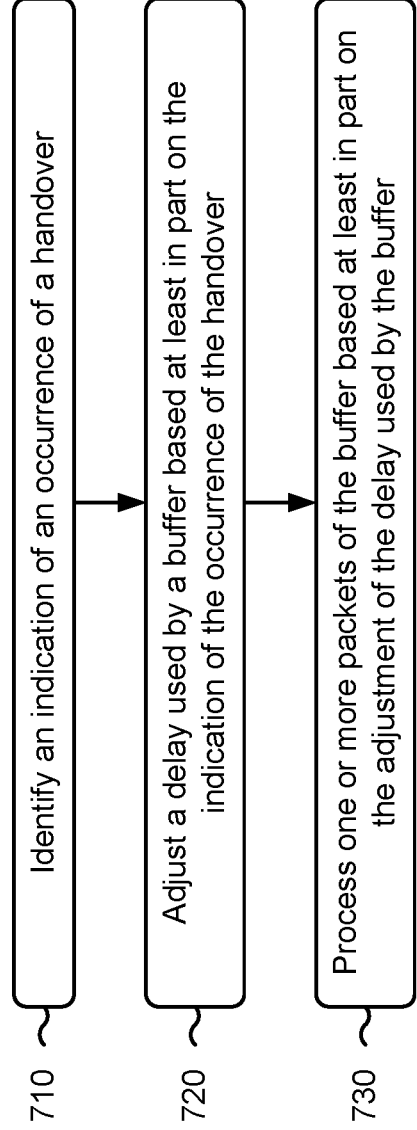
FIGS. 7-8 are diagrams illustrating example processes associated with buffer adjustment for handover, in accordance with the present disclosure.

FIG. 7 is a diagram illustrating an example process 700 performed, for example, by a UE, in accordance with the present disclosure. Example process 700 is an example where the UE (e.g., UE 120) performs operations associated with buffer adjustment for handover.

As shown in FIG. 7, in some aspects, process 700 may include identifying an indication of an occurrence of a handover (block 710). For example, the UE (e.g., using handover component 908, depicted in FIG. 9) may identify an indication of an occurrence of a handover, as described above.

As further shown in FIG. 7, in some aspects, process 700 may include adjusting a delay used by a buffer based at least in part on the indication of the occurrence of the handover (block 720). For example, the UE (e.g., using buffer component 910, depicted in FIG. 9) may adjust a delay used by a buffer based at least in part on the indication of the occurrence of the handover, as described above.

As further shown in FIG. 7, in some aspects, process 700 may include processing one or more packets of the buffer based at least in part on the adjustment of the delay used by the buffer (block 730). For example, the UE (e.g., using packet processing component 912, depicted in FIG. 9) may process one or more packets of the buffer based at least in part on the adjustment of the delay used by the buffer, as described above.

Process 700 may include additional aspects, such as any single aspect or any combination of aspects described below and/or in connection with one or more other processes described elsewhere herein.

In a first aspect, the adjustment of the delay is an increase of the delay.

In a second aspect, alone or in combination with the first aspect, the indication of the occurrence of the handover is based at least in part on one or more of a sensor input or an output of a machine learning model.

In a third aspect, alone or in combination with one or more of the first and second aspects, the indication of the occurrence of the handover includes one or more of a satisfaction of a pre-handover condition, a handover command, or a handover trigger.

In a fourth aspect, alone or in combination with one or more of the first through third aspects, the pre-handover condition is based at least in part on a condition for triggering measurement reporting or handover.

In a fifth aspect, alone or in combination with one or more of the first through fourth aspects, the condition for triggering measurement reporting or handover is that a signal strength measurement satisfies a threshold value, and the pre-handover condition is that the signal strength measurement satisfies the threshold value adjusted by an offset value.

In a sixth aspect, alone or in combination with one or more of the first through fifth aspects, process 700 includes providing, by a radio resource control module or a mobility manager module of the UE, a pre-handover indication or a handover start indication to the buffer.

In a seventh aspect, alone or in combination with one or more of the first through sixth aspects, the pre-handover indication or the handover start indication identifies a type of the handover.

In an eighth aspect, alone or in combination with one or more of the first through seventh aspects, the delay used by the buffer is adjusted based at least in part on the pre-handover indication or the handover start indication.

In a ninth aspect, alone or in combination with one or more of the first through eighth aspects, the delay used by the buffer is adjusted to a time value that is based at least in part on an estimated handover interruption time associated with the handover.

In a tenth aspect, alone or in combination with one or more of the first through ninth aspects, the one or more packets of the buffer are processed, based at least in part on the adjustment of the delay, for a duration of a timer.

In an eleventh aspect, alone or in combination with one or more of the first through tenth aspects, the one or more packets of the buffer are processed, based at least in part on the adjustment of the delay, until an indication of an occurrence of a handover conclusion.

In a twelfth aspect, alone or in combination with one or more of the first through eleventh aspects, the indication of the occurrence of the handover conclusion is based at least in part on one or more of a sensor input or an output of a machine learning model.

In a thirteenth aspect, alone or in combination with one or more of the first through twelfth aspects, the indication of the occurrence of the handover conclusion includes one or more of a satisfaction of a pre-handover cancel condition, a handover completion, or a handover failure.

In a fourteenth aspect, alone or in combination with one or more of the first through thirteenth aspects, the pre-handover cancel condition is based at least in part on a condition for exiting a triggered measurement reporting or handover.

In a fifteenth aspect, alone or in combination with one or more of the first through fourteenth aspects, the condition for exiting the triggered measurement reporting or handover is that a signal strength measurement satisfies a threshold value, and the pre-handover cancel condition is that the signal strength measurement satisfies the threshold value adjusted by an offset value.

In a sixteenth aspect, alone or in combination with one or more of the first through fifteenth aspects, process 700 includes providing, by a radio resource control module or a mobility manager module of the UE, a pre-handover cancel indication, a handover end indication, or a handover failure indication to the buffer.

In a seventeenth aspect, alone or in combination with one or more of the first through sixteenth aspects, the delay used by the buffer is used without adjustment based at least in part on the pre-handover cancel indication, the handover end indication, or the handover failure indication.

In an eighteenth aspect, alone or in combination with one or more of the first through seventeenth aspects, the delay used by the buffer is adjusted to a time value that is based at least in part on an estimated handover interruption time associated with a handover type of the handover, a maximum delay allowable for the buffer, or an unadjusted delay for the buffer.

In a nineteenth aspect, alone or in combination with one or more of the first through eighteenth aspects, the estimated handover interruption time is indicated by a table that identifies associations between a plurality of handover types and a plurality of estimated handover interruption times.

In a twentieth aspect, alone or in combination with one or more of the first through nineteenth aspects, the estimated handover interruption time is based at least in part on a location of the UE.

In a twenty-first aspect, alone or in combination with one or more of the first through twentieth aspects, the estimated handover interruption time is based at least in part on a first radio technology used by a source node for the handover and a second radio technology used by a target node for the handover.

In a twenty-second aspect, alone or in combination with one or more of the first through twenty-first aspects, the one or more packets of the buffer are processed, based at least in part on the adjustment of the delay, following an indication of an occurrence of a handover conclusion if the UE receives a high-speed train indication or if a handover rate of the UE satisfies a threshold.

In a twenty-third aspect, alone or in combination with one or more of the first through twenty-second aspects, process 700 further includes collecting information for at least a first packet received by the UE before the indication of the occurrence of the handover and a second packet received by the UE after an indication of an occurrence of a handover conclusion.

In a twenty-fourth aspect, alone or in combination with one or more of the first through twenty-third aspects, the information identifies an estimated handover interruption time for a handover type of the handover.

In a twenty-fifth aspect, alone or in combination with one or more of the first through twenty-fourth aspects, process 700 includes setting a redundancy offset based at least in part on identifying the indication of the occurrence of the handover.

In a twenty-sixth aspect, alone or in combination with one or more of the first through twenty-fifth aspects, the redundancy offset is based at least in part on a time value to which the delay used by the buffer is adjusted.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
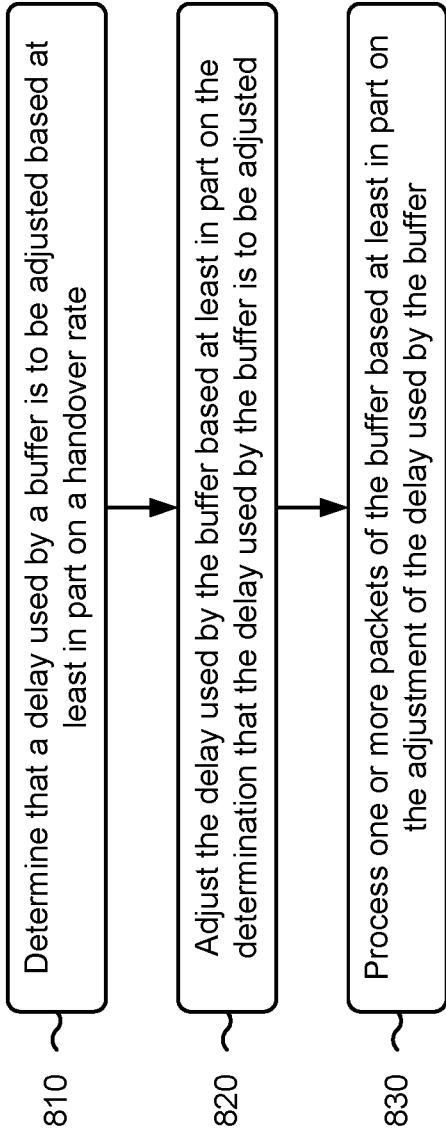

FIG. 8 is a diagram illustrating an example process 800 performed, for example, by a UE, in accordance with the present disclosure. Example process 800 is an example where the UE (e.g., UE 120) performs operations associated with buffer adjustment for handover.

As shown in FIG. 8, in some aspects, process 800 may include determining that a delay used by a buffer is to be adjusted based at least in part on a handover rate (block 810). For example, the UE (e.g., using handover component 908, depicted in FIG. 9) may determine that a delay used by a buffer is to be adjusted based at least in part on a handover rate, as described above.

As further shown in FIG. 8, in some aspects, process 800 may include adjusting the delay used by the buffer based at least in part on the determination that the delay used by the buffer is to be adjusted (block 820). For example, the UE (e.g., using buffer component 910, depicted in FIG. 9) may adjust the delay used by the buffer based at least in part on the determination that the delay used by the buffer is to be adjusted, as described above.

As further shown in FIG. 8, in some aspects, process 800 may include processing one or more packets of the buffer based at least in part on the adjustment of the delay used by the buffer (block 830). For example, the UE (e.g., using packet processing component 912, depicted in FIG. 9) may process one or more packets of the buffer based at least in part on the adjustment of the delay used by the buffer, as described above.

Process 800 may include additional aspects, such as any single aspect or any combination of aspects described below and/or in connection with one or more other processes described elsewhere herein.

In a first aspect, the adjustment of the delay is an increase of the delay.

In a second aspect, alone or in combination with the first aspect, the delay used by the buffer is adjusted based at least in part on the handover rate of the UE satisfying a threshold value for entering a delay adjustment time window.

In a third aspect, alone or in combination with one or more of the first and second aspects, the one or more packets of the buffer are processed, based at least in part on the adjustment of the delay, until the handover rate of the UE satisfies a threshold value for exiting a delay adjustment time window.

In a fourth aspect, alone or in combination with one or more of the first through third aspects, the delay used by the buffer is adjusted to a time value that is based at least in part on one or more estimated handover interruption times for handover types that are possible from a radio access technology used by a source cell for the UE.

In a fifth aspect, alone or in combination with one or more of the first through fourth aspects, the delay used by the buffer is adjusted to a time value that is based at least in part on one or more observed handover interruption times.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
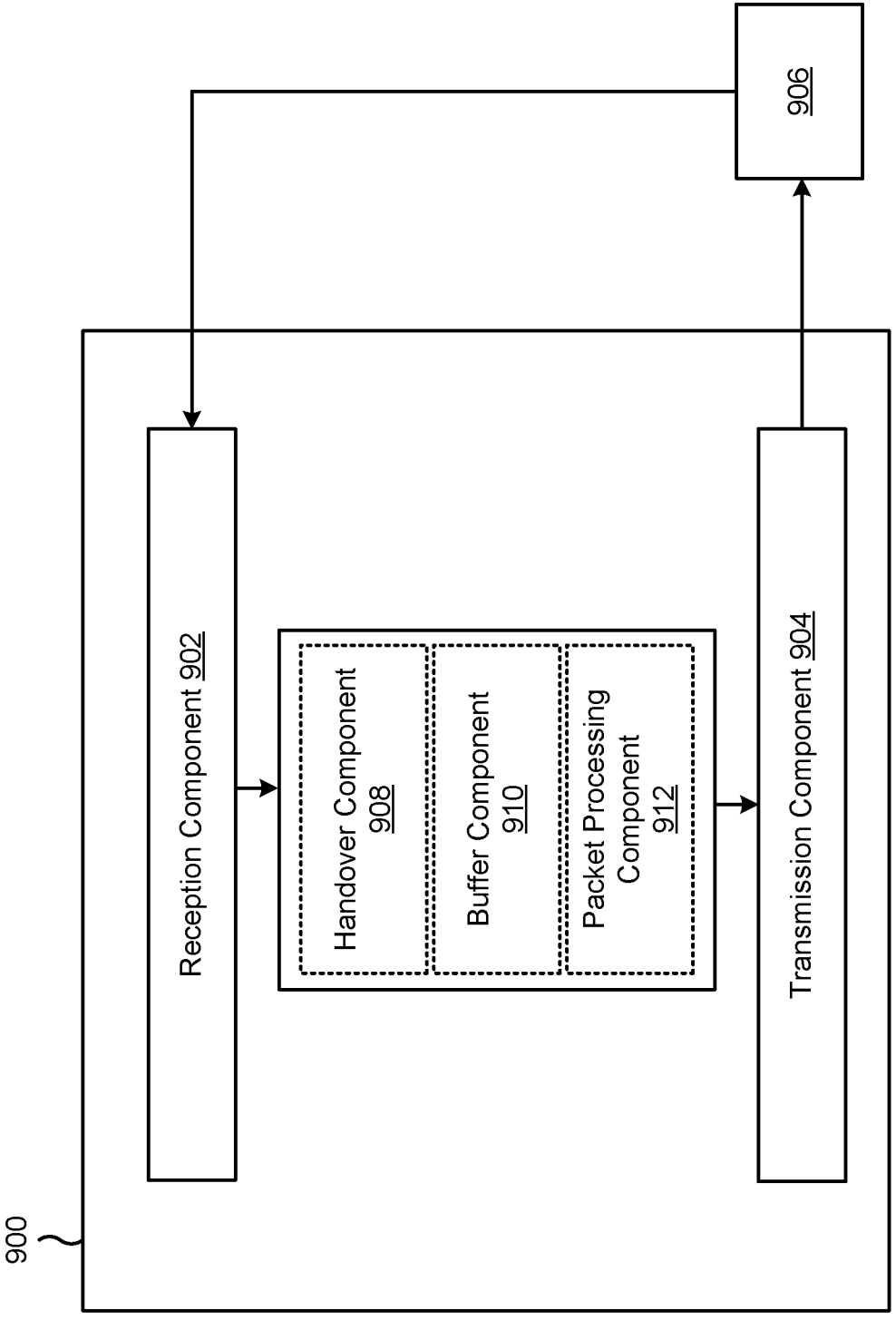
FIG. 9 is a diagram of an example apparatus for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a handover component 908, a buffer component 910, or a packet processing component 912, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The handover component 908 may identify an indication of an occurrence of a handover. The buffer component 910 may adjust a delay used by a buffer based at least in part on the indication of the occurrence of the handover. The packet processing component 912 may process one or more packets of the buffer based at least in part on the adjustment of the delay used by the buffer. The handover component 908 may provide a pre-handover indication or a handover start indication to the buffer (e.g., to the buffer component 910).

The handover component 908 may identify an indication of an occurrence of a handover conclusion. The buffer component 910 may adjust a delay (e.g., back to a normal delay) used by a buffer based at least in part on the indication of the occurrence of the handover conclusion. The packet processing component 912 may process one or more packets of the buffer based at least in part on the adjustment of the delay (e.g., back to a normal delay) used by the buffer. The handover component 908 may provide a pre-handover cancel indication, a handover end indication, or a handover failure indication to the buffer (e.g., to the buffer component 910).

The handover component 908 may determine that a delay used by a buffer is to be adjusted based at least in part on a handover rate. The buffer component 910 may adjust the delay used by the buffer based at least in part on the determination that the delay used by the buffer is to be adjusted. The packet processing component 912 may process one or more packets of the buffer based at least in part on the adjustment of the delay used by the buffer.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: identifying an indication of an occurrence of a handover; adjusting a delay used by a buffer based at least in part on the indication of the occurrence of the handover; and processing one or more packets of the buffer based at least in part on the adjustment of the delay used by the buffer.

Aspect 2: The method of Aspect 1, wherein the adjustment of the delay is an increase of the delay.

Aspect 3: The method of any of Aspects 1-2, wherein the indication of the occurrence of the handover is based at least in part on one or more of a sensor input or an output of a machine learning model.

Aspect 4: The method of any of Aspects 1-3, wherein the indication of the occurrence of the handover includes one or more of: a satisfaction of a pre-handover condition, a handover command, or a handover trigger.

Aspect 5: The method of Aspect 4, wherein the pre-handover condition is based at least in part on a condition for triggering measurement reporting or handover.

Aspect 6: The method of Aspect 5, wherein the condition for triggering measurement reporting or handover is that a signal strength measurement satisfies a threshold value, and wherein the pre-handover condition is that the signal strength measurement satisfies the threshold value adjusted by an offset value.

Aspect 7: The method of any of Aspects 1-6, further comprising: providing, by a radio resource control module or a mobility manager module of the UE, a pre-handover indication or a handover start indication to the buffer.

Aspect 8: The method of Aspect 7, wherein the pre-handover indication or the handover start indication identifies a type of the handover.

Aspect 9: The method of Aspect 7, wherein the delay used by the buffer is adjusted based at least in part on the pre-handover indication or the handover start indication.

Aspect 10: The method of any of Aspects 1-9, wherein the delay used by the buffer is adjusted to a time value that is based at least in part on an estimated handover interruption time associated with the handover.

Aspect 11: The method of any of Aspects 1-10, wherein the one or more packets of the buffer are processed, based at least in part on the adjustment of the delay, for a duration of a timer.

Aspect 12: The method of any of Aspects 1-10, wherein the one or more packets of the buffer are processed, based at least in part on the adjustment of the delay, until an indication of an occurrence of a handover conclusion.

Aspect 13: The method of Aspect 12, wherein the indication of the occurrence of the handover conclusion is based at least in part on one or more of a sensor input or an output of a machine learning model.

Aspect 14: The method of Aspect 12, wherein the indication of the occurrence of the handover conclusion includes one or more of: a satisfaction of a pre-handover cancel condition, a handover completion, or a handover failure.

Aspect 15: The method of Aspect 14, wherein the pre-handover cancel condition is based at least in part on a condition for exiting a triggered measurement reporting or handover.

Aspect 16: The method of Aspect 15, wherein the condition for exiting the triggered measurement reporting or handover is that a signal strength measurement satisfies a threshold value, and wherein the pre-handover cancel condition is that the signal strength measurement satisfies the threshold value adjusted by an offset value.

Aspect 17: The method of any of Aspects 1-16, further comprising: providing, by a radio resource control module or a mobility manager module of the UE, a pre-handover cancel indication, a handover end indication, or a handover failure indication to the buffer.

Aspect 18: The method of Aspect 17, wherein the delay used by the buffer is used without adjustment based at least in part on the pre-handover cancel indication, the handover end indication, or the handover failure indication.

Aspect 19: The method of any of Aspects 1-18, wherein the delay used by the buffer is adjusted to a time value that is based at least in part on an estimated handover interruption time associated with a handover type of the handover, a maximum delay allowable for the buffer, or an unadjusted delay for the buffer.

Aspect 20: The method of Aspect 19, wherein the estimated handover interruption time is indicated by a table that identifies associations between a plurality of handover types and a plurality of estimated handover interruption times.

Aspect 21: The method of any of Aspects 19-20, wherein the estimated handover interruption time is based at least in part on a location of the UE.

Aspect 22: The method of any of Aspects 19-21, wherein the estimated handover interruption time is based at least in part on a first radio technology used by a source node for the handover and a second radio technology used by a target node for the handover.

Aspect 23: The method of any of Aspects 1-17 or 19-22, wherein the one or more packets of the buffer are processed, based at least in part on the adjustment of the delay, following an indication of an occurrence of a handover conclusion if the UE receives a high-speed train indication or if a handover rate of the UE satisfies a threshold.

Aspect 24: The method of any of Aspects 1-23, further comprising: collecting information for at least a first packet received by the UE before the indication of the occurrence of the handover and a second packet received by the UE after an indication of an occurrence of a handover conclusion.

Aspect 25: The method of Aspect 24, wherein the information identifies an estimated handover interruption time for a handover type of the handover.

Aspect 26: The method of any of Aspects 1-25, further comprising: setting a redundancy offset based at least in part on identifying the indication of the occurrence of the handover.

Aspect 27: The method of Aspect 26, wherein the redundancy offset is based at least in part on a time value to which the delay used by the buffer is adjusted.

Aspect 28: A method of wireless communication performed by a user equipment (UE), comprising: determining that a delay used by a buffer is to be adjusted based at least in part on a handover rate; adjusting the delay used by the buffer based at least in part on the determination that the delay used by the buffer is to be adjusted; and processing one or more packets of the buffer based at least in part on the adjustment of the delay used by the buffer.

Aspect 29: The method of Aspect 28, wherein the adjustment of the delay is an increase of the delay.

Aspect 30: The method of any of Aspects 28-29, wherein the delay used by the buffer is adjusted based at least in part on the handover rate of the UE satisfying a threshold value for entering a delay adjustment time window.

Aspect 31: The method of any of Aspects 28-30, wherein the one or more packets of the buffer are processed, based at least in part on the adjustment of the delay, until the handover rate of the UE satisfies a threshold value for exiting a delay adjustment time window.

Aspect 32: The method of any of Aspects 28-31, wherein the delay used by the buffer is adjusted to a time value that is based at least in part on one or more estimated handover interruption times for handover types that are possible from a radio access technology used by a source cell for the UE.

Aspect 33: The method of any of Aspects 28-32, wherein the delay used by the buffer is adjusted to a time value that is based at least in part on one or more observed handover interruption times.

Aspect 34: An apparatus for wireless communication at a device, comprising a processor; memory coupled with the processor; and instructions stored in the memory and executable by the processor to cause the apparatus to perform the method of one or more of Aspects 1-27.

Aspect 35: A device for wireless communication, comprising a memory and one or more processors coupled to the memory, the one or more processors configured to perform the method of one or more of Aspects 1-27.

Aspect 36: An apparatus for wireless communication, comprising at least one means for performing the method of one or more of Aspects 1-27.

Aspect 37: A non-transitory computer-readable medium storing code for wireless communication, the code comprising instructions executable by a processor to perform the method of one or more of Aspects 1-27.

Aspect 38: A non-transitory computer-readable medium storing a set of instructions for wireless communication, the set of instructions comprising one or more instructions that, when executed by one or more processors of a device, cause the device to perform the method of one or more of Aspects 1-27.

Aspect 39: An apparatus for wireless communication at a device, comprising a processor; memory coupled with the processor; and instructions stored in the memory and executable by the processor to cause the apparatus to perform the method of one or more of Aspects 28-33.

Aspect 40: A device for wireless communication, comprising a memory and one or more processors coupled to the memory, the one or more processors configured to perform the method of one or more of Aspects 28-33.

Aspect 41: An apparatus for wireless communication, comprising at least one means for performing the method of one or more of Aspects 28-33.

Aspect 42: A non-transitory computer-readable medium storing code for wireless communication, the code comprising instructions executable by a processor to perform the method of one or more of Aspects 28-33.

Aspect 43: A non-transitory computer-readable medium storing a set of instructions for wireless communication, the set of instructions comprising one or more instructions that, when executed by one or more processors of a device, cause the device to perform the method of one or more of Aspects 28-33.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

identifying an indication of an occurrence of a handover, wherein identifying the indication of the occurrence of the handover comprises:

determining that a pre-handover condition is satisfied based at least in part on one or more of:

a signal strength measurement for a serving cell being less than a sum of a first threshold value, used for triggering measurement reporting or handover, and a first offset value, or a signal strength measurement for a target cell being greater than a difference of a second threshold value, used for triggering measurement reporting or handover, and a second offset value;

adjusting a delay used by a buffer based at least in part on the indication of the occurrence of the handover; and processing one or more packets of the buffer based at least in part on the adjustment of the delay used by the buffer.

2. The method of claim 1, wherein the indication of the occurrence of the handover includes one or more of:

a handover command, or a handover trigger.

3. The method of claim 1, further comprising:

providing, by a radio resource control module or a mobility manager module of the UE, a pre-handover indication or a handover start indication to the buffer.

4. The method of claim 3, wherein the pre-handover indication or the handover start indication identifies a type of the handover.

5. The method of claim 3, wherein the delay used by the buffer is adjusted based at least in part on the pre-handover indication or the handover start indication.

6. The method of claim 1, wherein the delay used by the buffer is adjusted to a time value that is based at least in part on an estimated handover interruption time associated with a handover type of the handover, a maximum delay allowable for the buffer, or an unadjusted delay for the buffer.

7. The method of claim 6, wherein the estimated handover interruption time is indicated by a table that identifies associations between a plurality of handover types and a plurality of estimated handover interruption times.

8. The method of claim 1, wherein the one or more packets of the buffer are processed, based at least in part on the adjustment of the delay, for a duration of a timer.

9. The method of claim 1, wherein the one or more packets of the buffer are processed, based at least in part on the adjustment of the delay, until an indication of an occurrence of a handover conclusion.

10. The method of claim 9, wherein the indication of the occurrence of the handover conclusion includes one or more of:

a satisfaction of a pre-handover cancel condition, a handover completion, or a handover failure.

11. The method of claim 10, wherein the pre-handover cancel condition is based at least in part on a condition for exiting a triggered measurement reporting or handover.

12. The method of claim 11, wherein the condition for exiting the triggered measurement reporting or handover is that another signal strength measurement satisfies a threshold value used for exiting the triggered measurement reporting or handover, and wherein the pre-handover cancel condition is that the other signal strength measurement satisfies the threshold value, used for exiting the triggered measurement reporting or handover, adjusted by an offset value.

13. The method of claim 1, further comprising:

providing, by a radio resource control module or a mobility manager module of the UE, a pre-handover cancel indication, a handover end indication, or a handover failure indication to the buffer.

14. The method of claim 13, wherein the delay used by the buffer is used without adjustment based at least in part on the pre-handover cancel indication, the handover end indication, or the handover failure indication.

15. The method of claim 1, further comprising:

collecting information for a first packet received by the UE before the indication of the occurrence of the handover and a second packet received by the UE after an indication of an occurrence of a handover conclusion, wherein the information identifies an estimated handover interruption time for a handover type of the handover.

16. The method of claim 1, further comprising:

setting a redundancy offset based at least in part on identifying the indication of the occurrence of the handover, wherein the redundancy offset is based at least in part on a time value to which the delay used by the buffer is adjusted.

17. A method of wireless communication performed by a user equipment (UE), comprising:

determining that a delay used by a buffer is to be adjusted based at least in part on a handover rate;

adjusting the delay used by the buffer based at least in part on the determination that the delay used by the buffer is to be adjusted, wherein the delay used by the buffer is adjusted to a time value that is:

a maximum handover interruption time among all handover types that are possible from a source cell for the UE, an average handover interruption time for the source cell, or a handover interruption time associated with a handover type that is most likely to occur from the source cell; and processing one or more packets of the buffer based at least in part on the adjustment of the delay used by the buffer.

18. The method of claim 17, wherein the delay used by the buffer is adjusted based at least in part on the handover rate satisfying a threshold value for entering a delay adjustment time window.

19. The method of claim 17, wherein the one or more packets of the buffer are processed, based at least in part on the adjustment of the delay, until the handover rate satisfies a threshold value for exiting a delay adjustment time window.

20. A user equipment (UE) for wireless communication, comprising:

one or more memories; and one or more processors, coupled to the one or more memories, configured to:

identify an indication of an occurrence of a handover, wherein the one or more processors, to identify the indication of the occurrence of the handover, are configured to:

determine that a pre-handover condition is satisfied based at least in part on one or more of:

a signal strength measurement for a serving cell being less than a sum of a first threshold value, used for triggering measurement reporting or handover, and a first offset value, or a signal strength measurement for a target cell being greater than a difference of a second threshold value, used for triggering measurement reporting or handover, and a second offset value;

adjust a delay used by a buffer based at least in part on the indication of the occurrence of the handover; and process one or more packets of the buffer based at least in part on the adjustment of the delay used by the buffer.

21. The UE of claim 20, wherein the one or more processors are further configured to:

provide, by a radio resource control module or a mobility manager module of the UE, a pre-handover indication or a handover start indication to the buffer.

22. The UE of claim 21, wherein the pre-handover indication or the handover start indication identifies a type of the handover.

23. The UE of claim 20, wherein the adjusted delay used by the buffer is a time value that is based at least in part on an estimated handover interruption time associated with a handover type of the handover, a maximum delay allowable for the buffer, or an unadjusted delay for the buffer.

24. A user equipment (UE) for wireless communication, comprising:

one or more memories; and one or more processors, coupled to the one or more memories, configured to:

determine that a delay used by a buffer is to be adjusted based at least in part on a handover rate;

adjust the delay used by the buffer based at least in part on the determination that the delay used by the buffer is to be adjusted, wherein the adjusted delay used by the buffer is a time value that is:

a maximum handover interruption time among all handover types that are possible from a source cell for the UE, an average handover interruption time for the source cell, or a handover interruption time associated with a handover type that is most likely to occur from the source cell; and process one or more packets of the buffer based at least in part on the adjustment of the delay used by the buffer.

25. The UE of claim 24, wherein the one or more processors, to adjust the delay used by the buffer, are configured to:

adjust the delay used by the buffer based at least in part on the handover rate of the UE satisfying a threshold value for entering a delay adjustment time window.

26. The UE of claim 21, wherein the delay used by the buffer is adjusted based at least in part on the pre-handover indication or the handover start indication.

27. The UE of claim 23, wherein the estimated handover interruption time is indicated by a table that identifies associations between a plurality of handover types and a plurality of estimated handover interruption times.

28. The UE of claim 20, wherein the one or more processors, to process the one or more packets of the buffer, are configured to:

process the one or more packets of the buffer for a duration of a timer.

29. The UE of claim 20, wherein the one or more processors, to process the one or more packets of the buffer, are configured to:

process the one or more packets of the buffer until an indication of an occurrence of a handover conclusion.

30. The UE of claim 24, wherein the one or more processors, to process the one or more packets of the buffer, are configured to:

process the one or more packets of the buffer until the handover rate satisfies a threshold value for exiting a delay adjustment time window.

* * * * *